(12) United States Patent
Lin

(10) Patent No.: US 8,686,994 B2
(45) Date of Patent: Apr. 1, 2014

(54) FULL-SCREEN 3D IMAGE DISPLAY DEVICE

(75) Inventor: Ming-Yen Lin, Taipei (TW)

(73) Assignee: Unique Instruments Co., Ltd, Taipei (TW)

( * ) Notice: Subject to any disclaimer, the term of this patent is extended or adjusted under 35 U.S.C. 154(b) by 625 days.

(21) Appl. No.: 12/982,262

(22) Filed: Dec. 30, 2010

(65) Prior Publication Data

US 2011/0157171 A1  Jun. 30, 2011

(30) Foreign Application Priority Data

Dec. 30, 2009  (TW) ............................... 98145946 A

(51) Int. Cl.
*G06T 15/00*  (2011.01)

(52) U.S. Cl.
USPC ................... 345/419; 345/32; 349/8; 349/15; 349/117; 349/201

(58) Field of Classification Search
USPC ................... 345/419, 32; 349/8, 15, 117, 201
See application file for complete search history.

(56) References Cited

U.S. PATENT DOCUMENTS

| | | | |
|---|---|---|---|
| 7,623,188 B2 * | 11/2009 | Hamagishi | 349/8 |
| 7,834,944 B2 * | 11/2010 | Otte et al. | 349/15 |
| 7,920,216 B2 * | 4/2011 | Hsu et al. | 349/15 |
| 8,144,079 B2 * | 3/2012 | Mather et al. | 345/32 |
| 2011/0170026 A1 * | 7/2011 | Lin | 349/15 |
| 2011/0222017 A1 * | 9/2011 | Lin | 349/201 |

* cited by examiner

*Primary Examiner* — Phu K Nguyen
(74) *Attorney, Agent, or Firm* — WPAT, PC; Justin King

(57) ABSTRACT

A full-screen 3D image display device provides a dynamic liquid crystal parallax barrier device for solving a 3D image resolution deterioration problem caused by view separation of a multi-view 3D image displayed by a conventional parallax barrier, and achieves the purpose of displaying a multi-view 3D image with a full-screen image resolution through a multi-view image dynamic combination and display procedure and a barrier electrode dynamic driving procedure.

19 Claims, 38 Drawing Sheets

$$\sum_{i=0}^{M-1} \sum_{n=0}^{\text{int}(N/2)-1} V_1^{i,2n}$$

FULL-SCREEN 3D IMAGE DISPLAY DEVICE

BACKGROUND OF THE INVENTION

1. Field of Invention

The present invention relates to a full-screen 3D image display device, which provides a dynamic liquid crystal parallax barrier device for solving a 3D image resolution deterioration problem caused by view separation of a multi-view 3D image displayed by a conventional parallax barrier, and achieves the purpose of displaying a multi-view 3D image with a full-screen image resolution through a multi-view image dynamic combination and display procedure and a barrier electrode dynamic driving procedure.

2. Related Art

FIG. 1 to FIG. 3 are schematic views of structure of three types of parallax barriers in the prior art. FIG. 1 is a schematic view of a vertical strip parallax barrier in the prior art, FIG. 2 is a schematic view of a slant-and-strip parallax barrier in the prior art, and FIG. 3 is a schematic view of a slant-and-step parallax barrier in the prior art. The basic optical structures of the vertical strip parallax barrier 10, the slant-and-strip parallax barrier 20, and the slant-and-step parallax barrier 30 include light-transmissive elements 11, 21, 31 and shielding elements 12, 22, 32 respectively. The relevant principles of the three types of parallax barriers, the designs and optical functions of the parallax barrier structures, and the construction of the multi-view 3D image may refer to the paper "Theory of Parallax Barriers", Sam H. Kaplan, Vol. 59, Journal of the SMPTE, 1952, and may refer to ROC Patent Application No. 097135421, No. 098113625, and No. 098128986 for details.

In general, the parallax barrier may be fabricated by using a liquid crystal panel technique, and after driven by a voltage, the optical effect of the light-transmissive elements 11, 21, 31 and the shielding elements 12, 22, 32 can be achieved.

FIG. 4 is a schematic view of structure of a liquid crystal parallax barrier in the prior art. The liquid crystal parallax barrier 50 mainly consists of two linear polarizers 51, two transparent substrates 52 (for example, glass), a common electrode layer 53, a barrier electrode layer 56, two alignment layers 54, and a liquid crystal molecular layer 55. The structure of the liquid crystal parallax barrier in the prior art may refer to U.S. Pat. No. 5,315,377. The liquid crystal molecular layer 55 generally adopts a TN liquid crystal material. The two linear polarizers 51 respectively have a light polarization direction and both polarization directions are perpendicular to each other. The common electrode layer 53 and the barrier electrode layer 56 are transparent electrodes formed by ITO (referred to as electrodes for short hereinafter). An electrode structure 57 of the barrier electrode layer 56 is formed by a barrier structure including a vertical strip parallax barrier, a slant-and-strip parallax barrier, or a slant-and-step parallax barrier. When a voltage between the electrode structure 57 and the common electrode layer 53 is 0, all the liquid crystal molecules of the liquid crystal molecular layer 55 are in a spiral configuration, which allows all the incident light 58 to penetrate through the liquid crystal parallax barrier 50 (definitely, the light transmittance of the above elements is not 100 percent, and the incident light is somewhat absorbed). Therefore, the liquid crystal parallax barrier 50 is in a transparent state.

As shown in FIG. 5, when a proper driving voltage v (which can be a square wave electrical signal having a proper amplitude and period) is applied between the electrode structure 57 and the common electrode layer 53, the liquid crystal molecules between the electrode structure 57 and the common electrode layer 53 are in an upright configuration, thereby achieving the effect of shielding the incident light 58 (in the following illustration, when the electrode structure is marked by the black color, it indicates that the electrode has a light shielding effect). Therefore, the electrode structure 57 becomes the shielding element of the parallax barrier, and the region outside the electrode structure 57 is regarded as the light-transmissive element of the parallax barrier. As such, under the control of the external driving voltage, the liquid crystal parallax barrier in the prior art may achieve the 2D/3D switching effect.

As described above, the optical functions of the light-transmissive elements 11, 21, 31 and the shielding elements 12, 22, 32 perform the view separation on a multi-view 3D image (which is a full-screen multi-view 3D image formed by the combination of a plurality of single-view images with the parallax effect) displayed on a screen at an optimal viewing position on an optimal viewing distance. That is, the single-view image is presented at the respective optimal viewing position. However, the image resolution of the separated single-view image is deteriorated with the increase of the number of views, and finally the deterioration of the 3D image resolution occurs. For simplifying illustration, the vertical strip parallax barrier and the double-view image are adopted for illustrating the deterioration of the single-view image resolution after separation.

FIG. 6 is a schematic view of the consisting of a full-screen image in the prior art. As shown in FIG. 6, the full-screen image 70 is a display frame of a common flat panel display screen, which is formed by M×N R, G, B sub-pixel images $V^{i,j}$, where i and j are the indices representing respectively vertical and horizontal positions of the sub-pixel image $V^{i,j}$ and i=0 to M−1, j=0 to N−1. Therefore, a mathematical expression $$\sum_{i=0}^{M-1} \sum_{j=0}^{N-1} V^{i,j}$$

is used to indicate the consisting of the full-screen image 70. In addition, the R, G, B sub-pixels may be configured along the horizontal direction or the vertical direction.

Figure 7:
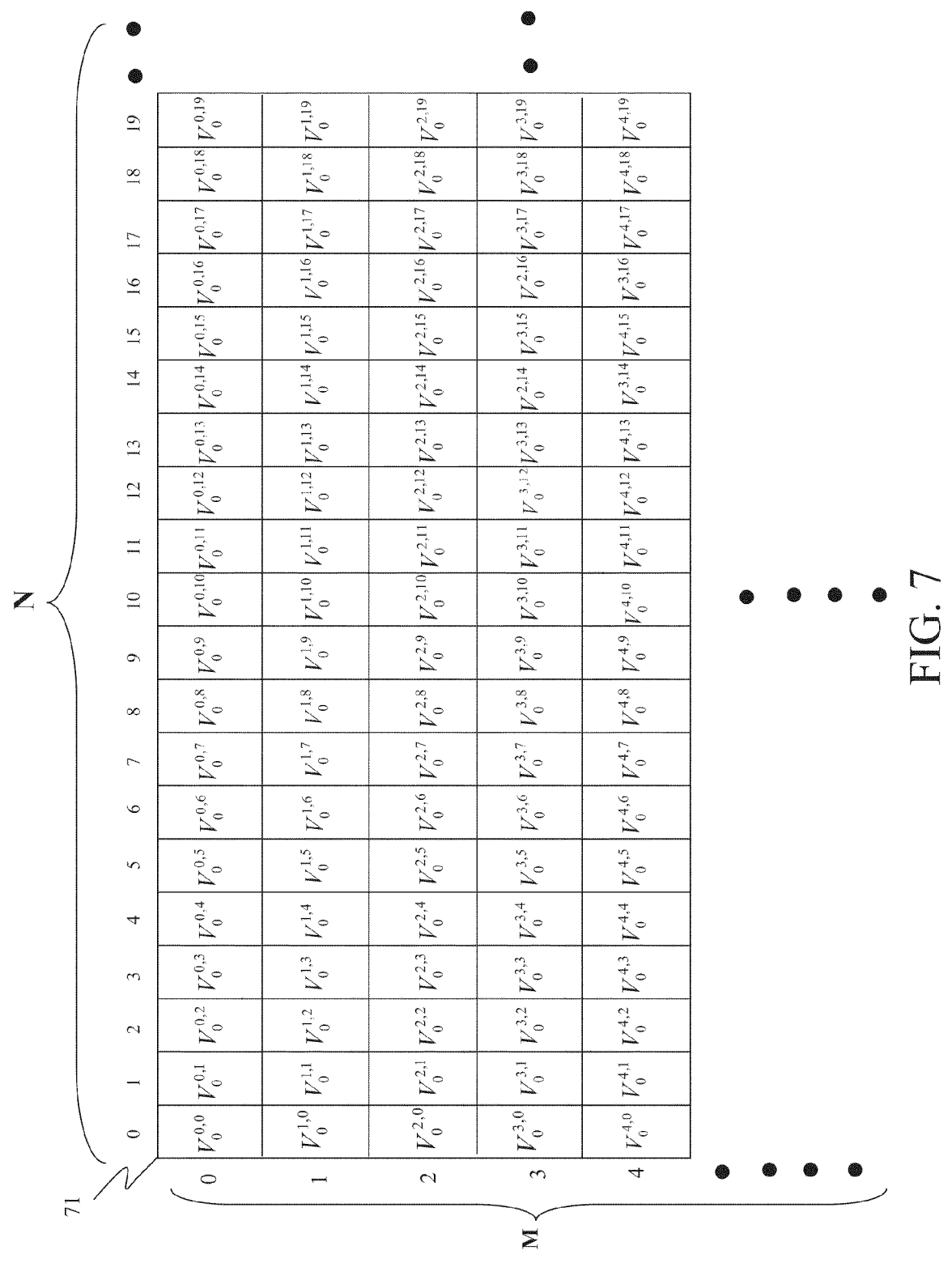

FIG. 7 is a schematic view of the consisting of a left-view image before the combination of a double-view image. The left-view image 71 is a full-screen image formed by M×N R, G, B sub-pixel images $V_0^{i,j}$. FIG. 8 is a schematic view of the consisting of a right-view image before the combination of a double-view image. The right-view image 72 is a full-screen image formed by M×N R, G, B sub-pixel images $V_1^{i,j}$.

FIG. 9 is a schematic view of the consisting of a double-view combined image. As shown in FIG. 9, the left-view image 71 and the right-view image 72 are combined in a vertical interlacing manner to form a full-screen double-view combined image 73. That is to say, the full-screen image is obtained by inserting at the positions of the even-numbered columns the images $V_0^{i,2n}$ at the positions of the even-numbered columns of the left-view, and inserting at the positions of the odd-numbered columns the images $V_1^{i,2n+1}$ at the positions of the odd-numbered columns of the right-view. Therefore, the structure of the double-view combined image 73 is expressed by the following formula:

$$\Sigma_0(t) = \sum_{i=0}^{M-1} \sum_{n=0}^{int(N/2)-1} [V_0^{i,2n} + V_1^{i,2n+1}] \quad (1)$$

where t is time, n is an integer from 0 to int(N/2)−1, and int is a rounding function.

In addition, regarding the slant-and-strip parallax barrier and the slant-and-step parallax barrier, the double-view combined image can be expressed by the following formula:

$$\Sigma_0(t) = \sum_{i=0}^{M-1} \sum_{n=0}^{int(N/2)-1} \left[V_0^{i,2n+Mod(i/2)} + V_1^{i,2n+Mod\left(\frac{i+1}{2}\right)}\right] \quad (2)$$

where Mod is a remainder function.

FIG. 10 is a schematic view of a separation function on a double-view combined image. As shown in FIG. 10, for a double-view combined image 73 displayed on a screen 60 (only a part of the screen and the double-view combined image are shown), the vertical strip parallax barrier 80 performs view separation on the double-view combined image 73 at a plurality of optimal viewing positions $V_0$, $V_1$ (only four optimal viewing positions are shown, and a distance $L_V$ between the two optimal viewing positions $V_0$, $V_1$ is the average interpupillary distance (IPD)) on the optimal viewing distance $Z_0$. Therefore, a single-view image is individually presented at the optimal viewing positions $V_0$, $V_1$, and the separated single-view image is characterized in having a half-screen resolution. FIG. 11 is a schematic view of a half-screen left-view image presented at the optimal viewing position $V_0$. The half-screen left-view image $$\sum_{i=0}^{M-1} \sum_{n=0}^{int(N/2)-1} V_0^{i,2n}$$

is formed by the even-numbered columns of images $V_0^{i,2n}$ of the left-view image 71. FIG. 12 is a schematic view of a half-screen right-view image presented at the optimal viewing position $V_1$. The half-screen right-view image $$\sum_{i=0}^{M-1} \sum_{n=0}^{int(N/2)-1} V_1^{i,2n+1}$$

is formed by the odd-numbered columns of images $V_1^{i,2n+1}$ of the right-view image 72.

Therefore, regarding the multi-view image having the number of views greater than 2, when the number of views is larger, the resolution of the displayed 3D image is reduced. For example, regarding a four-view image, the resolution of the separated single-view images is reduced to a quarter of the resolution of the full-screen image.

SUMMARY OF THE INVENTION

A full-screen 3D image display device of the present invention provides a dynamic liquid crystal parallax barrier device for solving a 3D image resolution deterioration problem caused by view separation of a multi-view 3D image displayed by a conventional parallax barrier, and achieves the purpose of displaying a multi-view 3D image with a full-screen image resolution through a multi-view image dynamic combination and display procedure and a barrier electrode dynamic driving procedure.

BRIEF DESCRIPTION OF THE DRAWINGS

The present invention will become more fully understood from the detailed description given herein below for illustration only, and thus are not limitative of the present invention, and wherein:

FIG. 7 is a schematic view of consisting of a left-view image before combination;

Figure 8:
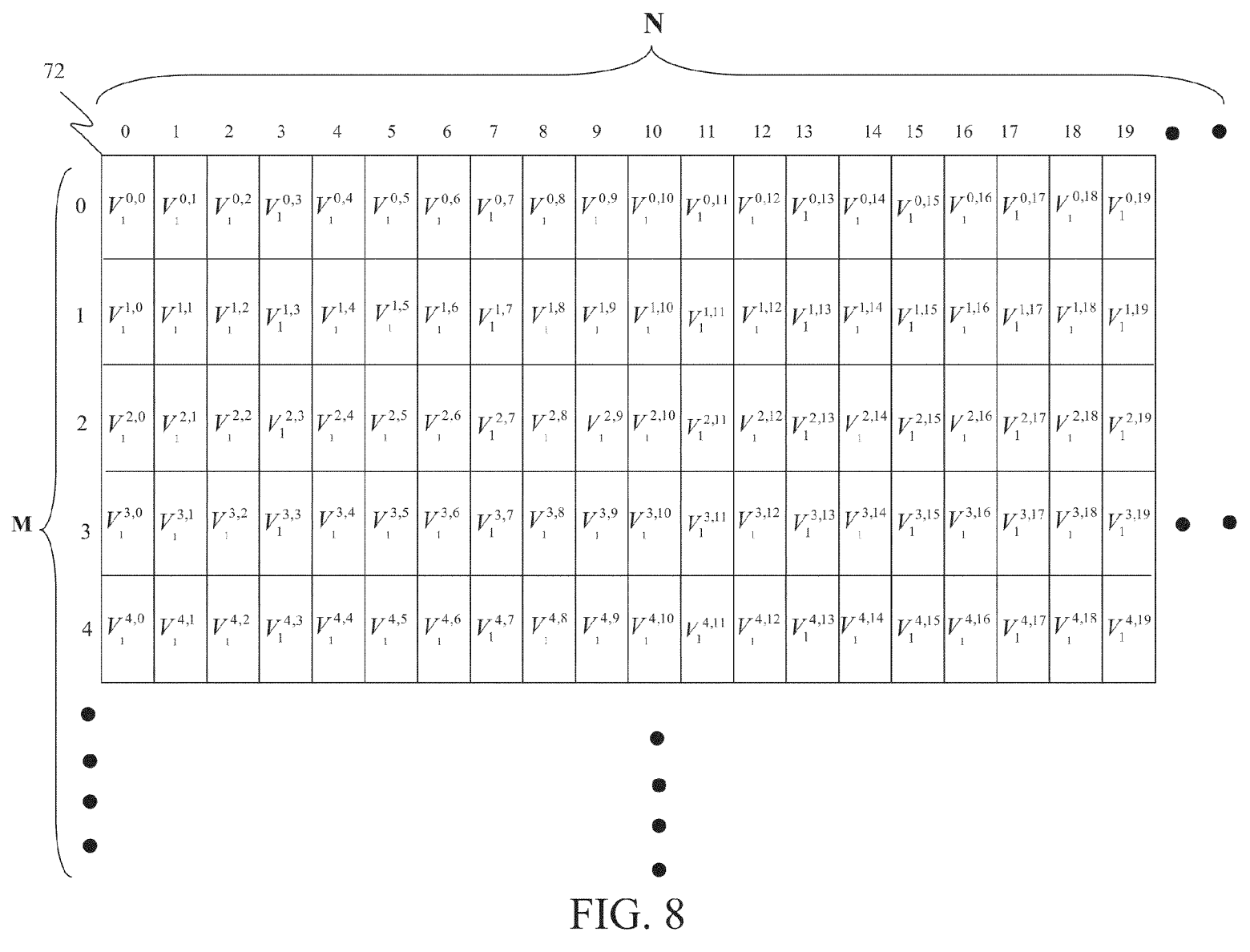

FIG. 8 is a schematic view of consisting of a right-view image before combination;

FIG. 9 is a schematic view of consisting of a double-view combined image;

FIG. 11 and FIG. 23 are schematic views of a half-frame left-view image;

FIG. 12 and FIG. 24 are schematic views of a half-frame right-view image;

FIG. 22 is a schematic view of consisting of a double-view combined image;

DETAILED DESCRIPTION OF THE INVENTION

First Embodiment

Figure 13:
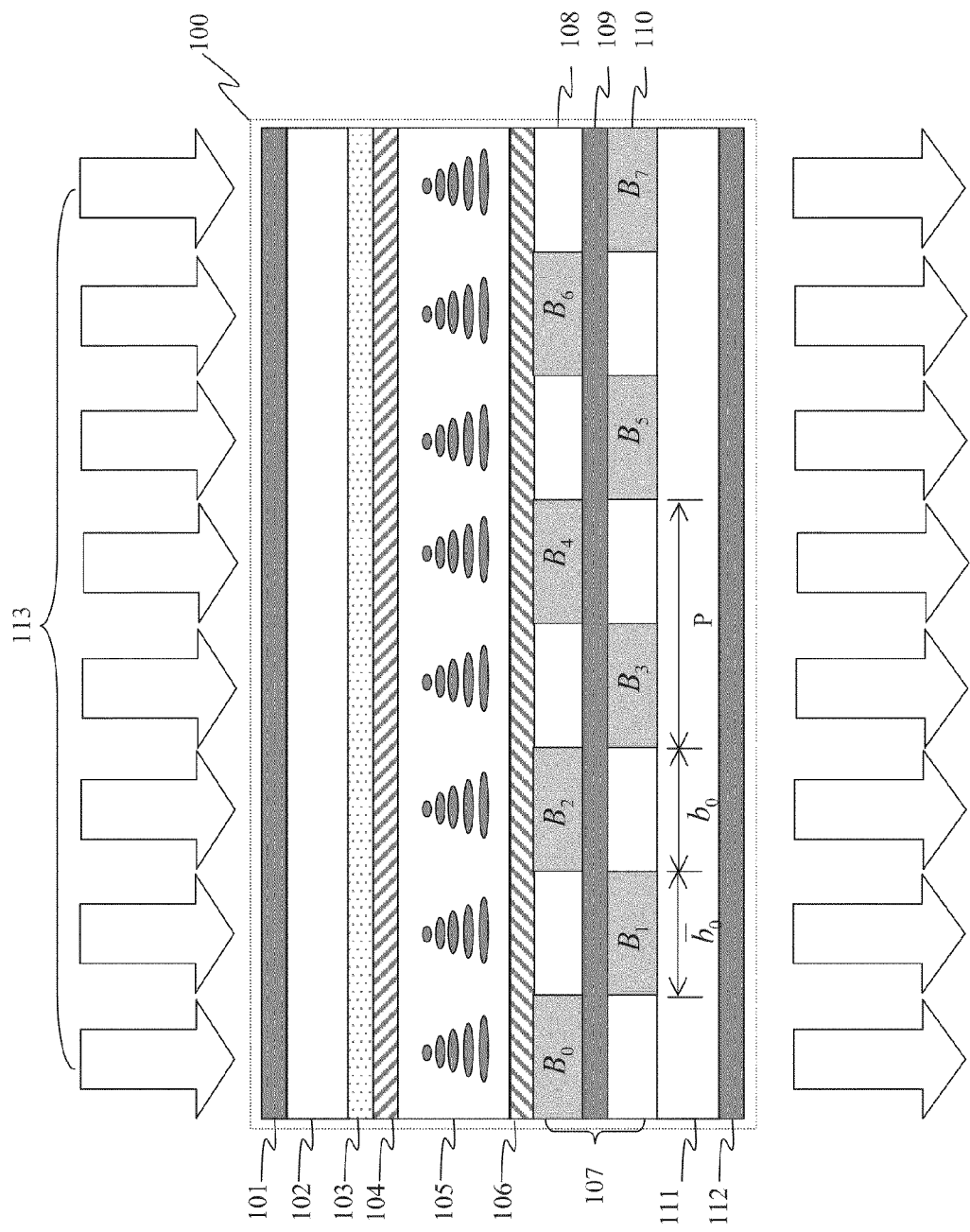
FIG. 13 is a schematic view of structure of a dynamic liquid crystal parallax barrier device according to a first embodiment of the present invention.

FIG. 13 is a schematic view of structure of a dynamic liquid crystal parallax barrier device according to a first embodiment of the present invention. The dynamic liquid crystal parallax barrier device 100 mainly includes an upper linear polarizer 101, an upper transparent substrate 102, a common electrode layer 103, an upper alignment layer 104, a liquid crystal molecular layer 105, a lower alignment layer 106, a pair of barrier electrode layers 107, a lower transparent substrate 111, and a lower linear polarizer 112. The upper linear polarizer 101, the upper transparent substrate 102, the common electrode layer 103, the upper alignment layer 104, the liquid crystal molecular layer 105, the lower alignment layer 106, the lower transparent substrate 111, and the lower linear polarizer 112 have the structures and effects of the liquid crystal parallax barrier in the prior art as described above, and the details will not be repeated herein. The pair of barrier electrode layers 107 are formed by two barrier electrode layers 108, 110 and an insulation layer 109. The insulation layer 109 electrically isolates the two barrier electrode layers 108, 110 to avoid an electrical short circuit occurring between the two barrier electrode layers.

The two barrier electrode layers are formed by an upper barrier electrode layer 108 and a lower barrier electrode layer 110. The upper and lower barrier electrode layers 108, 110 are respectively installed with electrodes $B_{2n}$, $B_{2n+1}$ characterized in having a spatial periodic distribution (only $B_0$, $B_2$, $B_4$, $B_6$ and $B_1$, $B_3$, $B_5$, $B_7$ are shown and n is a positive integer including 0). For simplifying illustration, each electrode is marked by an index (i.e., the subscript number) to indicate the position of the electrode device. Here, the electrodes $B_{2n}$, $B_{2n+1}$ with a spatial periodic distribution means that the electrodes $B_{2n}$, $B_{2n+1}$ have a same width (set to be an electrode width $\overline{b}_0$) and the non-electrode parts also have a same width (set to be a non-electrode width $b_0$), which are characterized in that $\overline{b}_0 = b_0$. Therefore, the single electrode width $\overline{b}_0$ and the single non-electrode width $b_0$ form a basic period width P (P=$\overline{b}_0+b_0$) of the electrode. In addition, the installation positions of the electrodes $B_{2n}$, $B_{2n+1}$, are offset by the electrode width $\overline{b}_0$ relative to each other. In consideration of the processing and assembly error generated in actual fabrication of the upper and lower barrier electrode layers 108, 110, the electrode width $\overline{b}_0$ of each of the electrodes $B_{2n}$ and $B_{2n+1}$ is properly added with an error correction amount $\Delta b$ (not shown), so that the electrode width is increased to be $\overline{b}_0+\Delta b$ and the non-electrode width is reduced to be $b_0-\Delta b$. Therefore, the basic period width of the electrode keeps the relation of P=$\overline{b}_0+b_0$, thereby maintaining the optical characteristic of the dynamic liquid crystal parallax barrier device, i.e., making the optimal viewing distance $Z_0$ and the average IPD $L_V$ remain unchanged.

Figure 14:
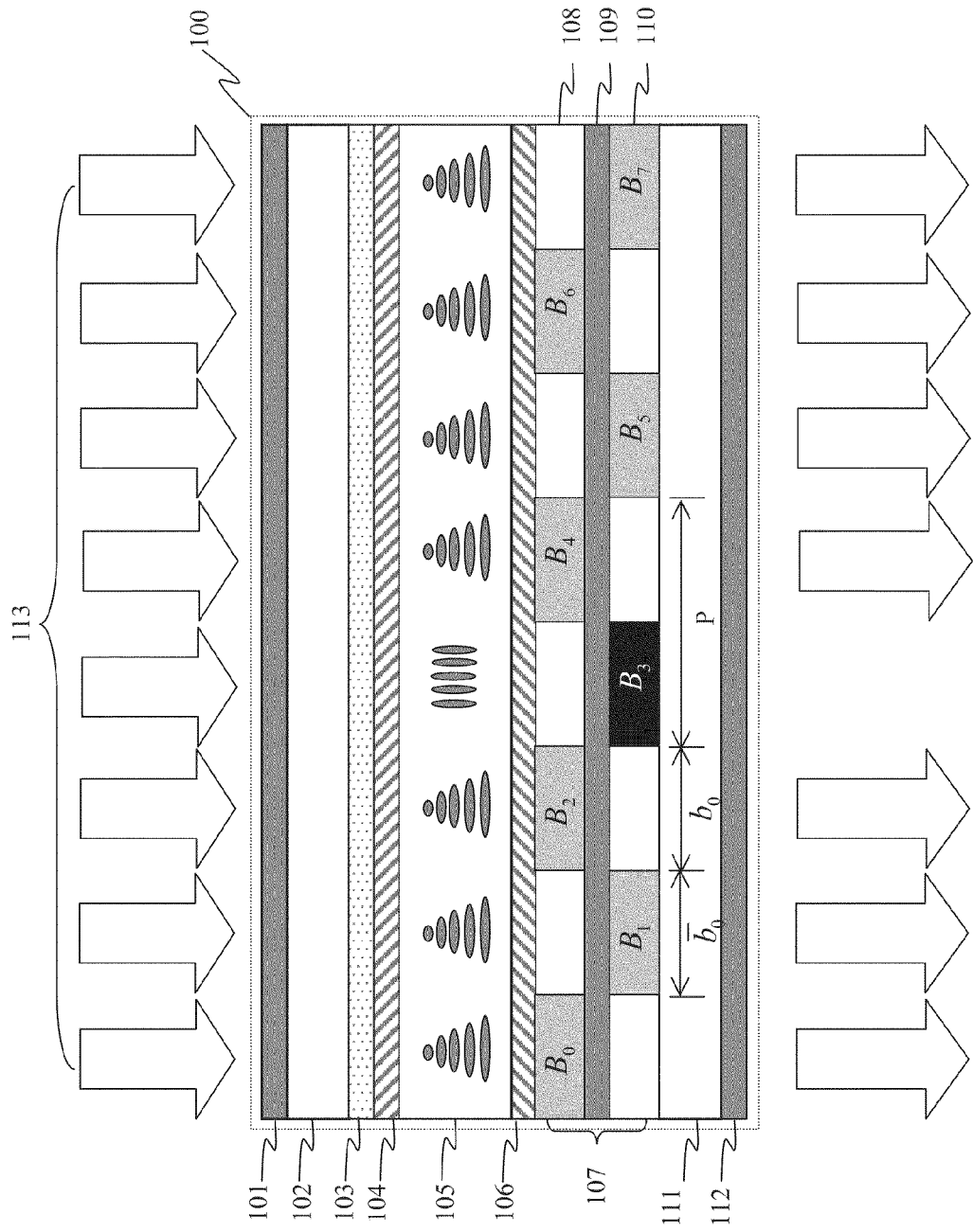
FIG. 14 is a schematic view of an incident light shielded by an electrode $B_3$.
Figure 15:
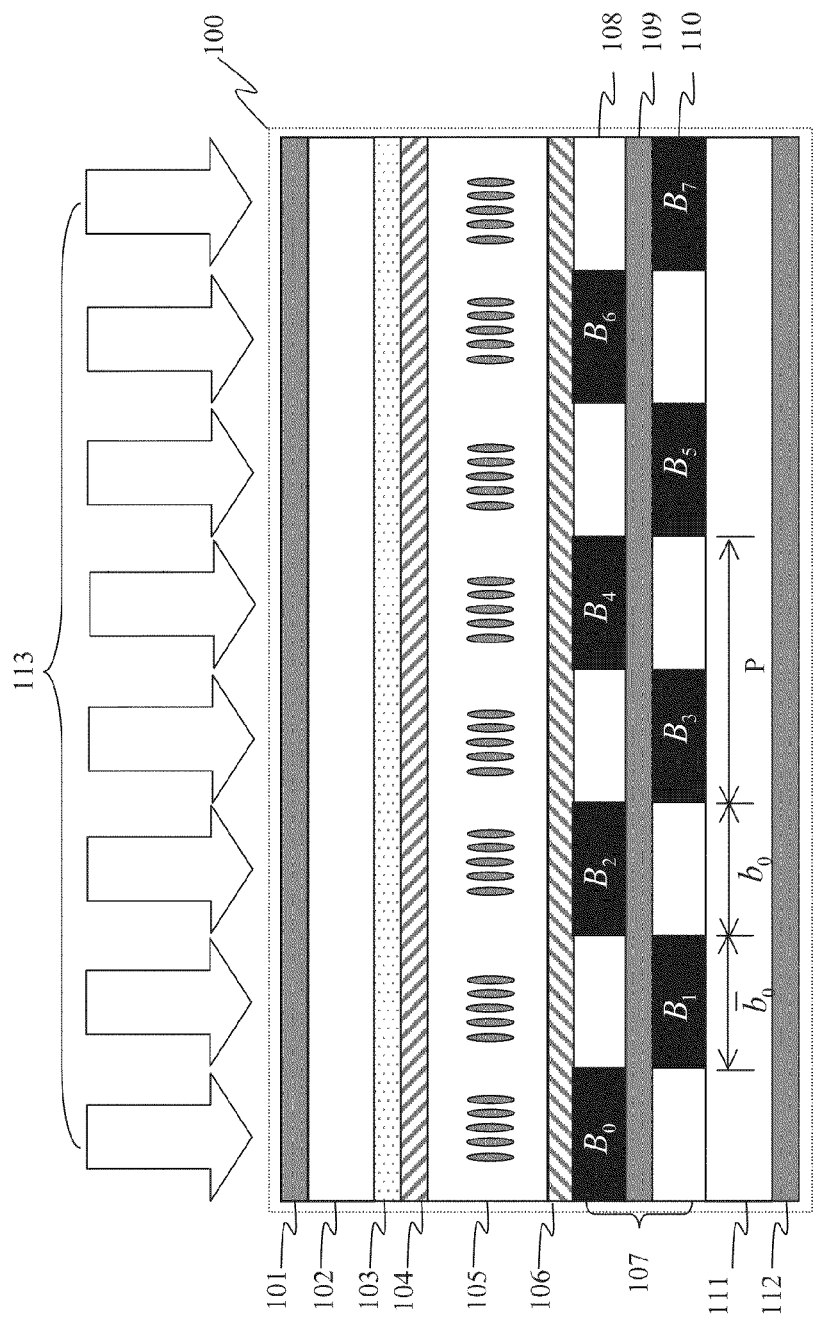
FIG. 15 is a schematic view of a dynamic liquid crystal parallax barrier device in a completely shielding state.

According to the structure of the liquid crystal parallax barrier in the prior art, when the light polarization directions of the upper and lower linear polarizers 101, 112 are perpendicular to each other, the electrodes $B_{2n}$, $B_{2n+1}$ are driven by an external voltage to generate a light shielding effect. Therefore, a shielding element of the parallax barrier is formed. The non-electrode part is always in a light-transmissive state. Thus, a light-transmissive element of the parallax barrier is formed. In this case, if all the electrodes $B_{2n}$ and $B_{2n+1}$ are not driven by the external voltage, as shown in FIG. 13, the dynamic liquid crystal parallax barrier device 100 is in a transparent state, that is, the incident light 113 may completely penetrate the dynamic liquid crystal parallax barrier device 100. If any of the electrodes (e.g., $B_3$) is input with an external driving voltage, as shown in FIG. 14, the incident light passing through the electrode (e.g., $B_3$) is shielded. In addition, if all the electrodes $B_{2n}$ and $B_{2n+1}$ are input with an external driving voltage, as shown in FIG. 15, all the incident light 113 is shielded, and the dynamic liquid crystal parallax barrier device 100 is in a completely shielding state. Moreover, when the light polarization directions of the upper and lower linear polarizers 101, 112 are in a parallel state, the functions of the electrodes of FIG. 13 to FIG. 15 on the incident light are in opposite optical states (not shown). That is to say, any of the electrodes is in a shielding state when not driven by the external voltage, and is in a light-transmissive state when driven by the external voltage. The non-electrode part is in the shielding state only. It is commonly known that different light polarization directions of the upper and lower linear polarizers 101, 112 may influence the optical states of the electrodes, so the details will not be repeated herein.

For simplifying illustration, the vertical strip parallax barrier and the double-view, three-view, and four-view images are taken as examples for describing the application of the dynamic liquid crystal parallax barrier device of the present invention, so as to achieve the 3D image display with a full-screen resolution.

Figure 16:
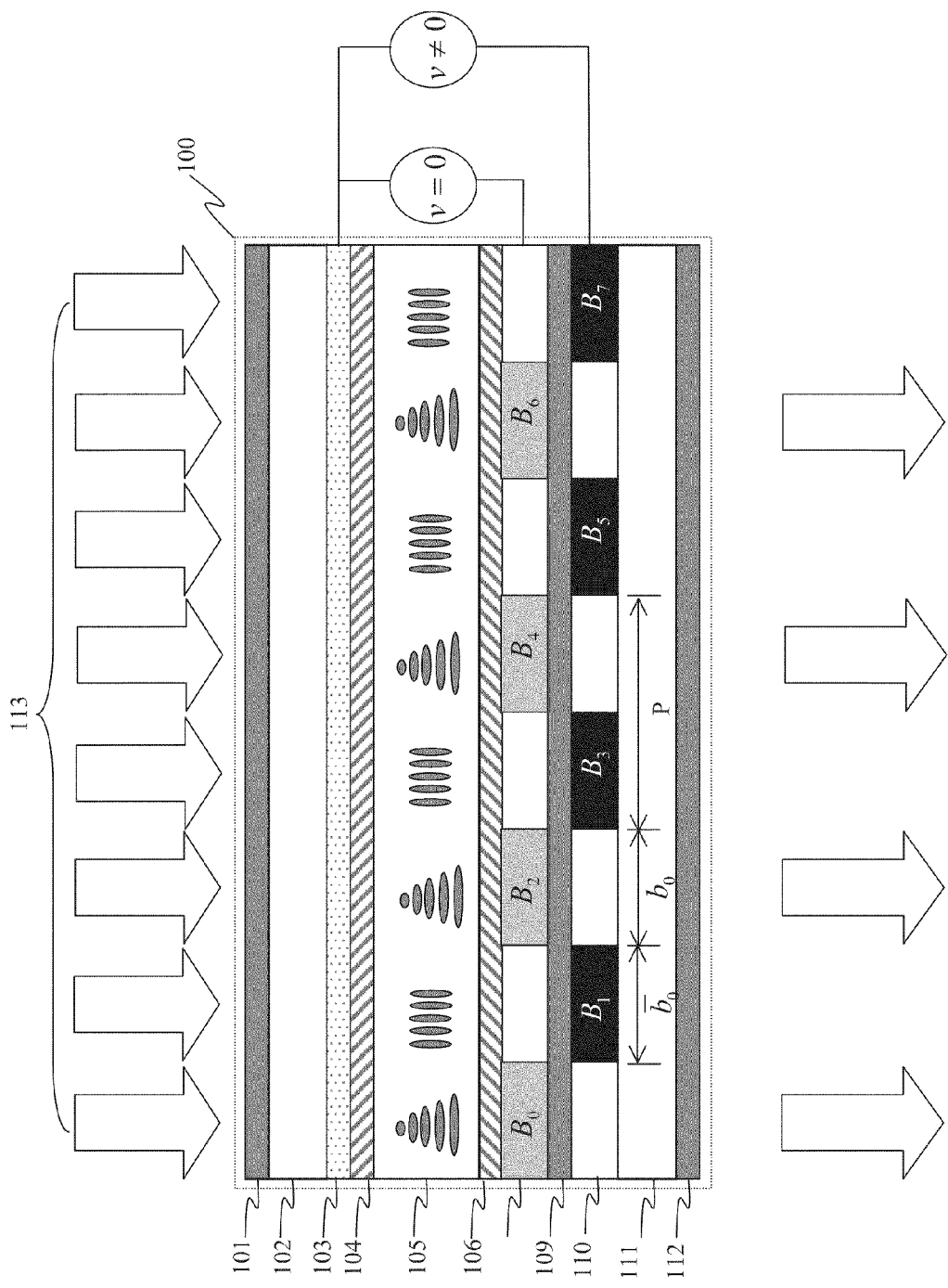
FIG. 16 and FIG. 17 are schematic views of operations of a double-view vertical strip dynamic liquid crystal parallax barrier device.
Figure 17:
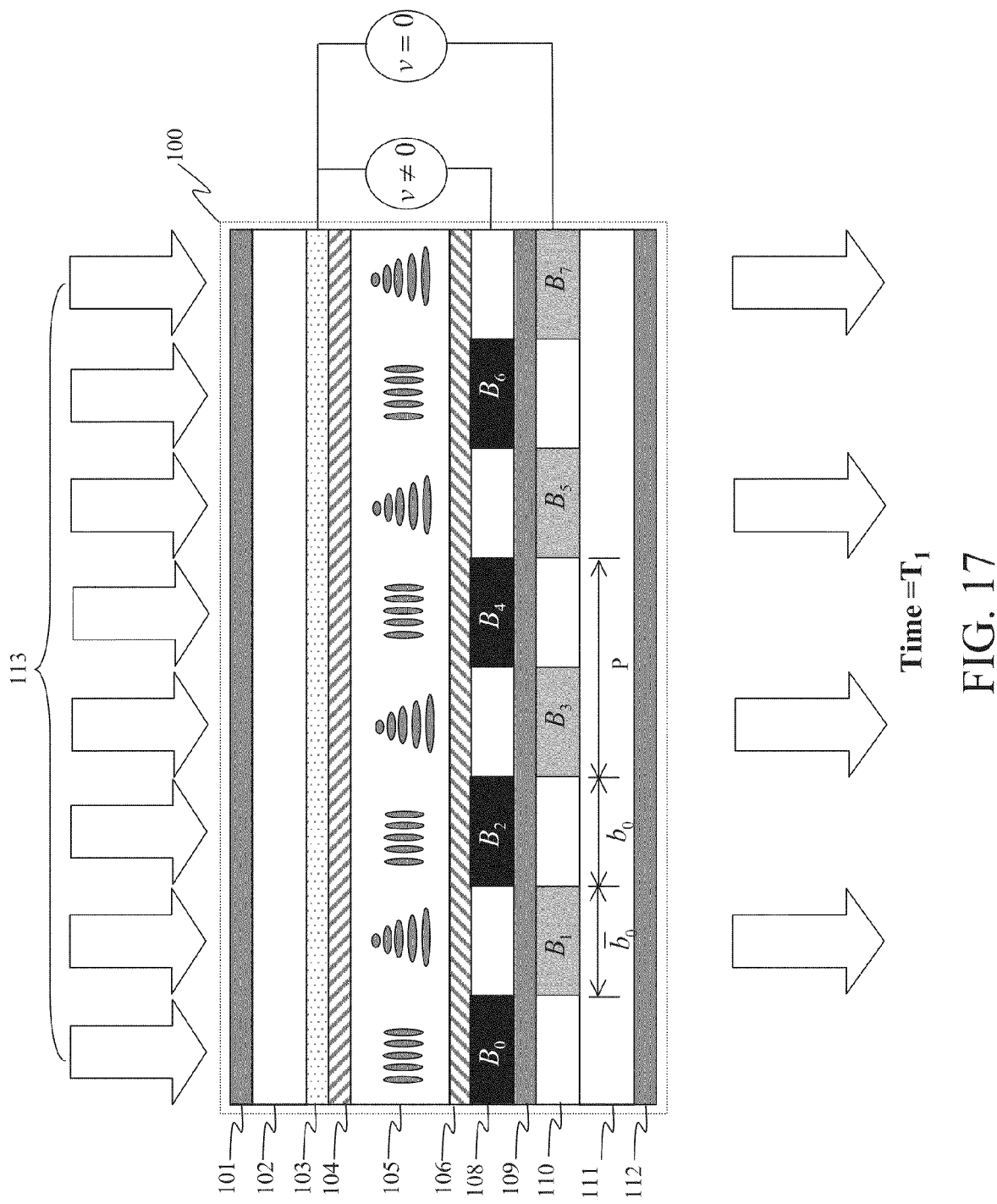

FIG. 16 and FIG. 17 are schematic views of operations of a double-view vertical strip dynamic liquid crystal parallax barrier device. The double-view vertical strip dynamic liquid crystal parallax barrier device 100 has electrodes $B_{2n}$ and $B_{2n+1}$ with a proper barrier electrode width $\overline{b}$ for separating a double-view image. As shown in FIG. 16, at a time point $T_0$, all the electrodes $B_{2n+1}$ are input with a proper driving voltage v, and thus all the electrodes $B_{2n+1}$ achieve an incident light shielding effect. As shown in FIG. 17, at a time point $T_1$, all the electrode $B_{2n}$ are input with a proper driving voltage v, and thus all the electrodes $B_{2n}$ achieve the incident light shielding effect.

Figure 18:
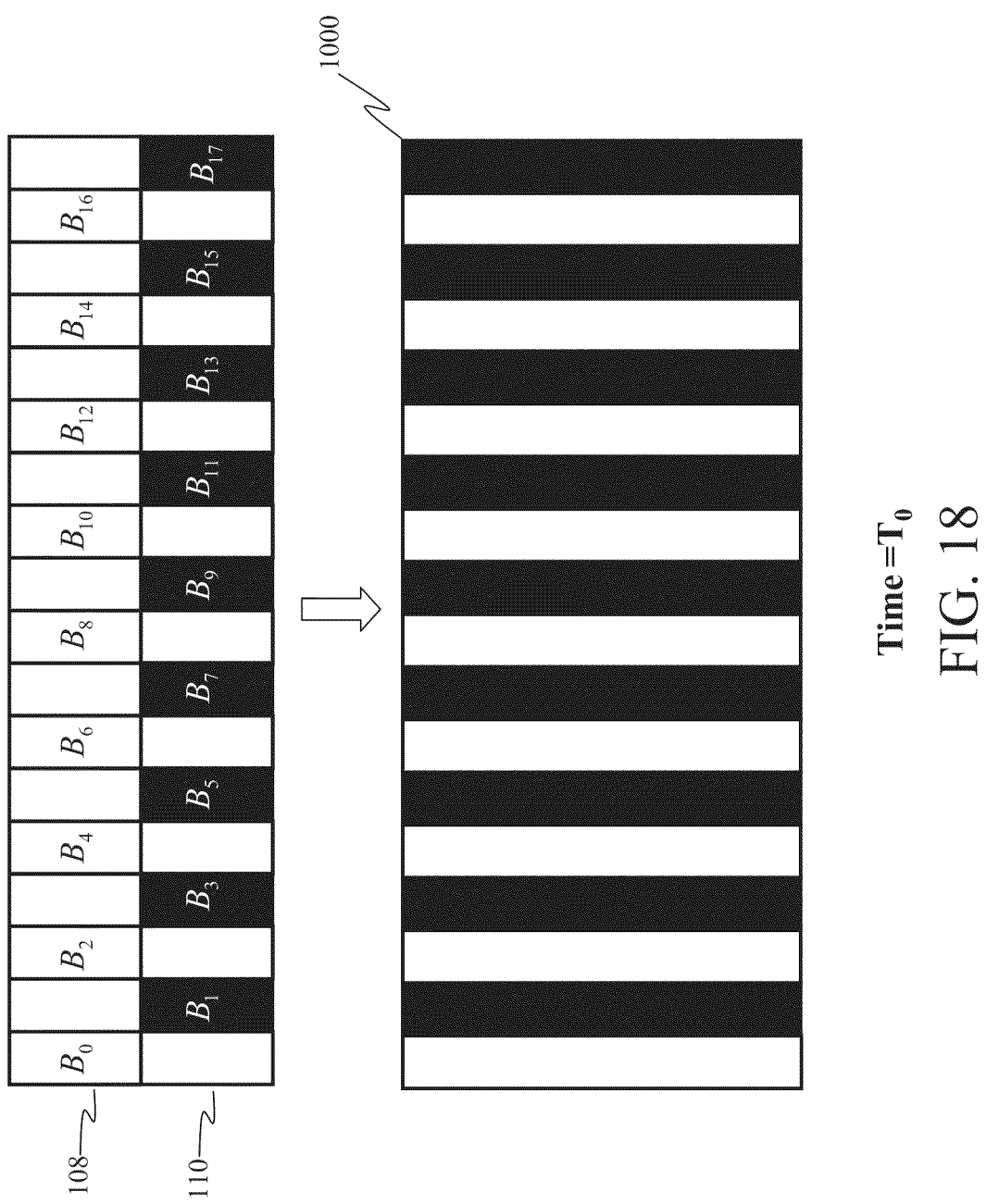
FIG. 18 and FIG. 19 are schematic views of electrode functions of a double-view vertical strip dynamic liquid crystal parallax barrier device.
Figure 19:
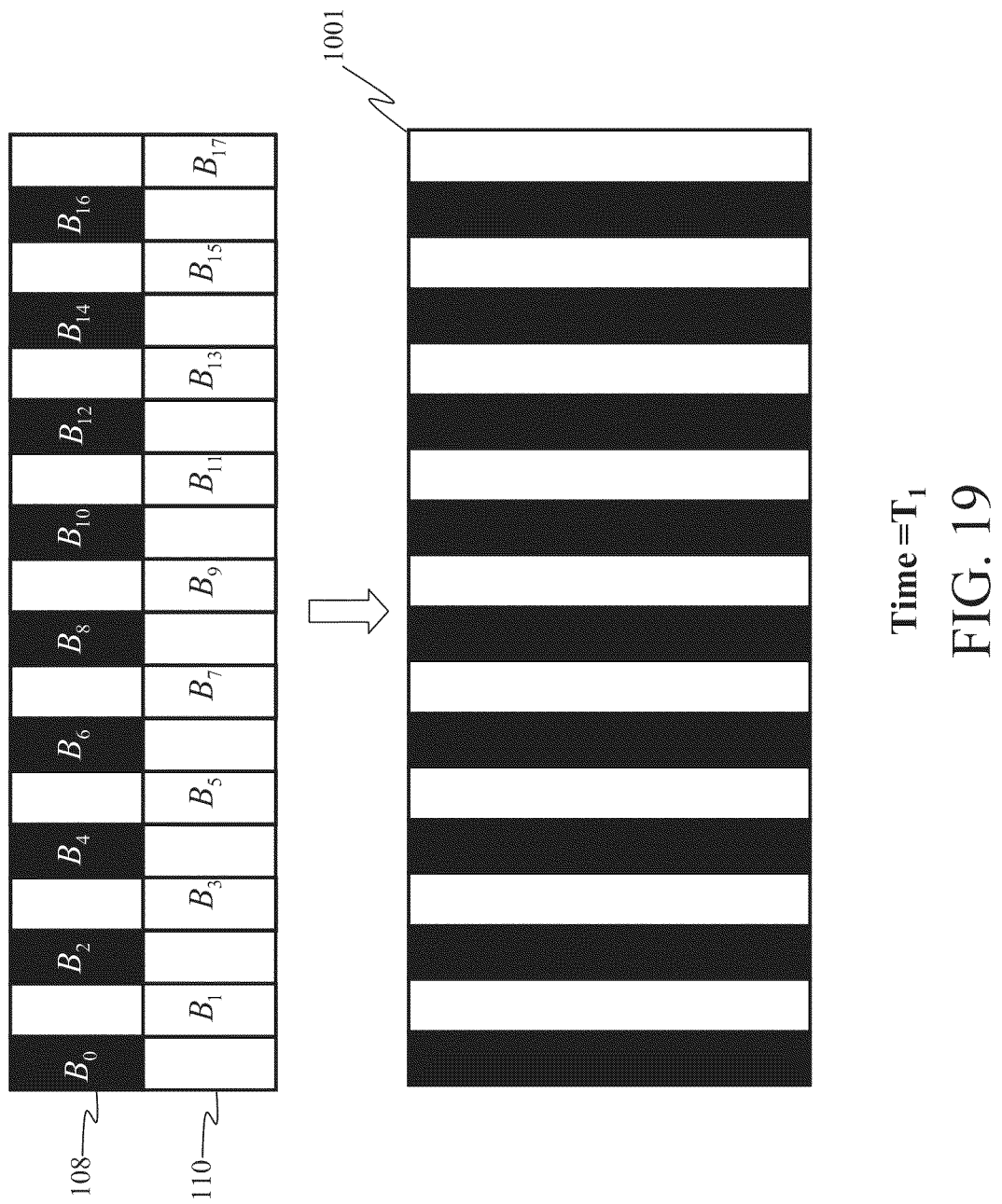

FIG. 18 and FIG. 19 are schematic views of electrode functions of a double-view vertical strip dynamic liquid crystal parallax barrier device. For the simplicity of the drawings of the electrode structures and functions, square blocks are used to replace the electrodes $B_{2n}$ and $B_{2n+1}$ and blank or black color is used to indicate whether the electrode is in a voltage driving state or a non-voltage driving state. For example, the blank square block indicates that the electrode is in a non-voltage driving state, and the black square block indicates that the electrode is in a voltage driving state.

Therefore, as shown in FIG. 18, when t=$T_0$, the electrode $B_{2n}$ is in the non-voltage driving state, and the electrode $B_{2n+1}$ is in the voltage driving state. In this case, the light-transmissive effect is presented at the electrode $B_{2n}$ and the shielding effect is presented at the electrode $B_{2n+1}$, and this optical state is referred to as a $T_0$ barrier state 1000 hereinafter.

In addition, as shown in FIG. 19, when t=$T_1$, the electrode $B_{2n}$ is in the voltage driving state, and the electrode $B_{2n+1}$ is in the non-voltage driving state. Therefore, the shielding effect is presented at the electrode $B_{2n}$ and the light-transmissive effect is presented at the electrode $B_{2n+1}$, and this optical state is referred to as a $T_1$ barrier state 1001 hereinafter.

Figure 20:
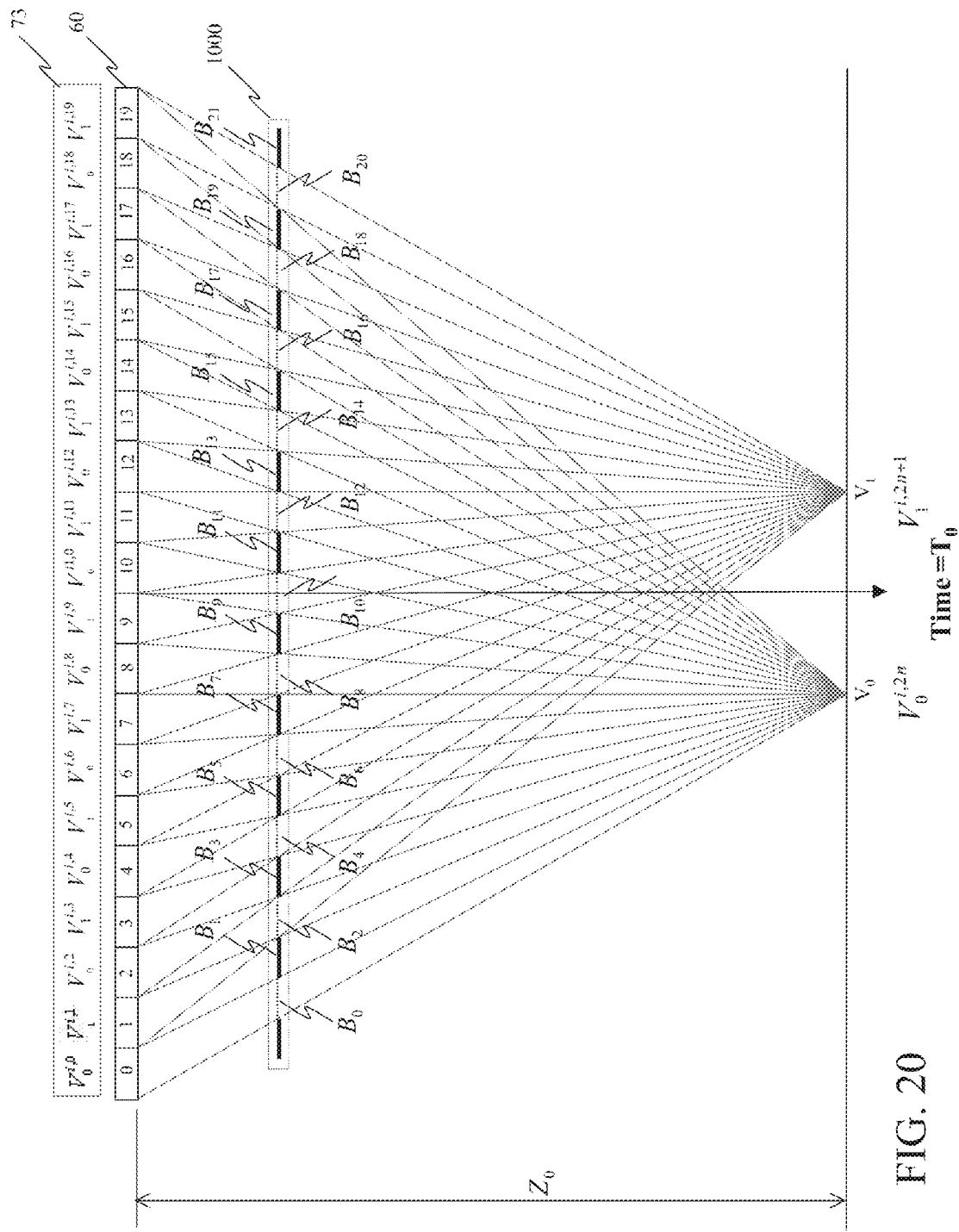
FIG. 20 and FIG. 21 are schematic views of 3D image display of a double-view vertical strip dynamic liquid crystal parallax barrier device.
Figure 21:
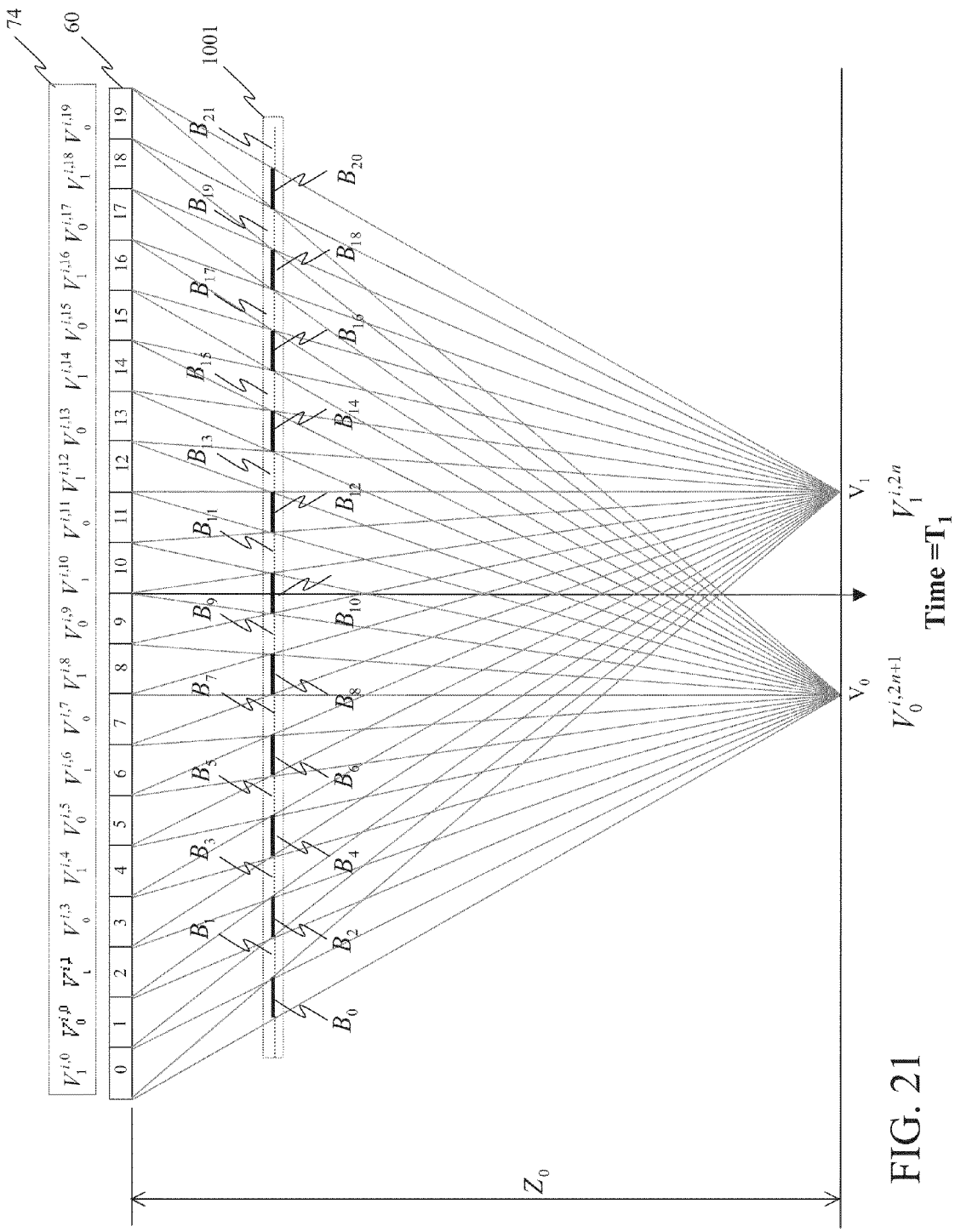

FIG. 20 and FIG. 21 are schematic views of 3D image display of a double-view vertical strip dynamic liquid crystal parallax barrier device.

Figure 9:
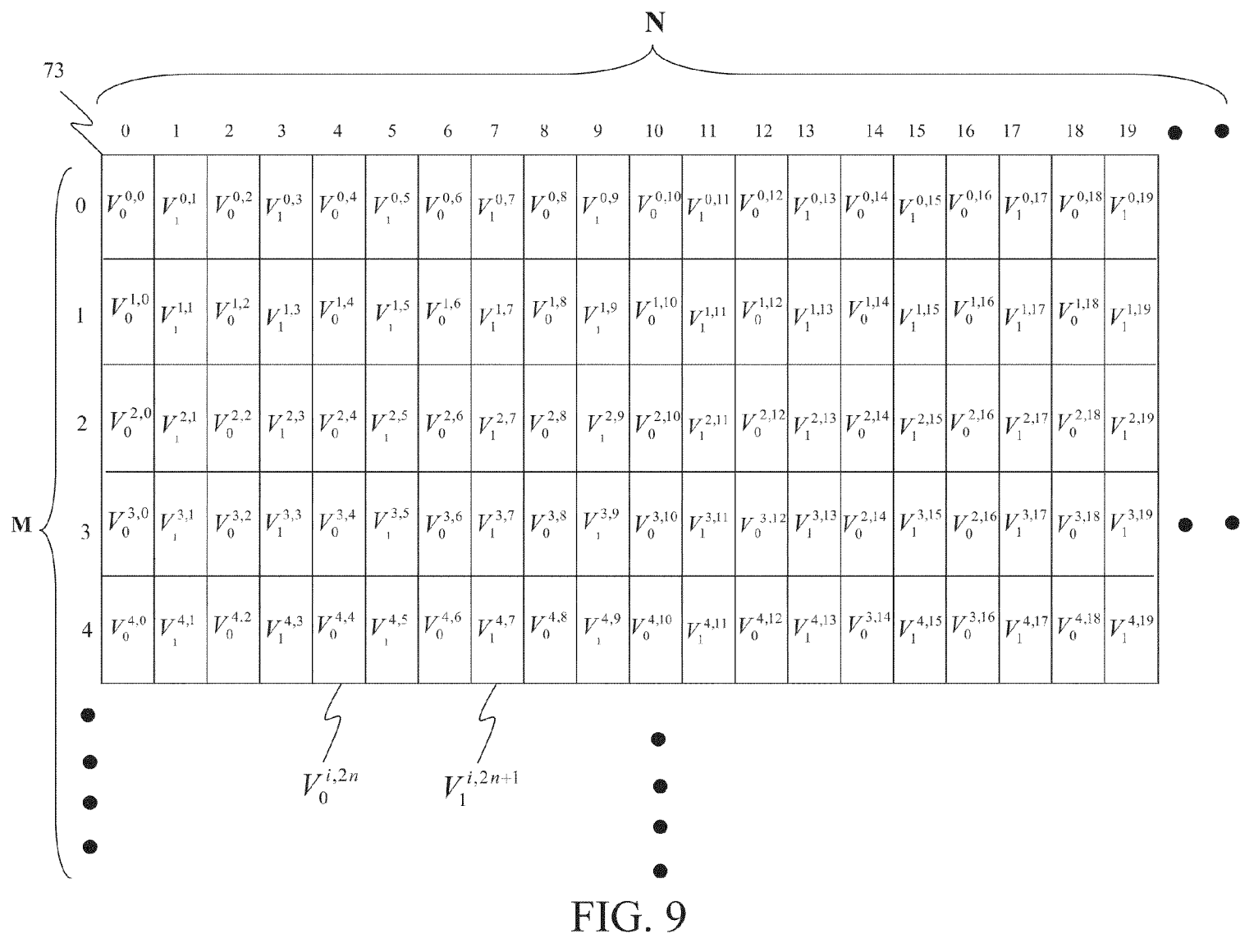

As shown in FIG. 20, when $t=T_0$, for the double-view combined image 73 (i.e., $\Sigma_0(t)$, as shown in FIG. 9) displayed on the screen 60, since the double-view vertical strip dynamic liquid crystal parallax barrier device is in the $T_0$ barrier state 1000, the double-view image 73 is separated into the images $$\sum_{i=0}^{M-1} \sum_{n=0}^{int(N/2)-1} V_0^{i,2n}$$

Figure 11:
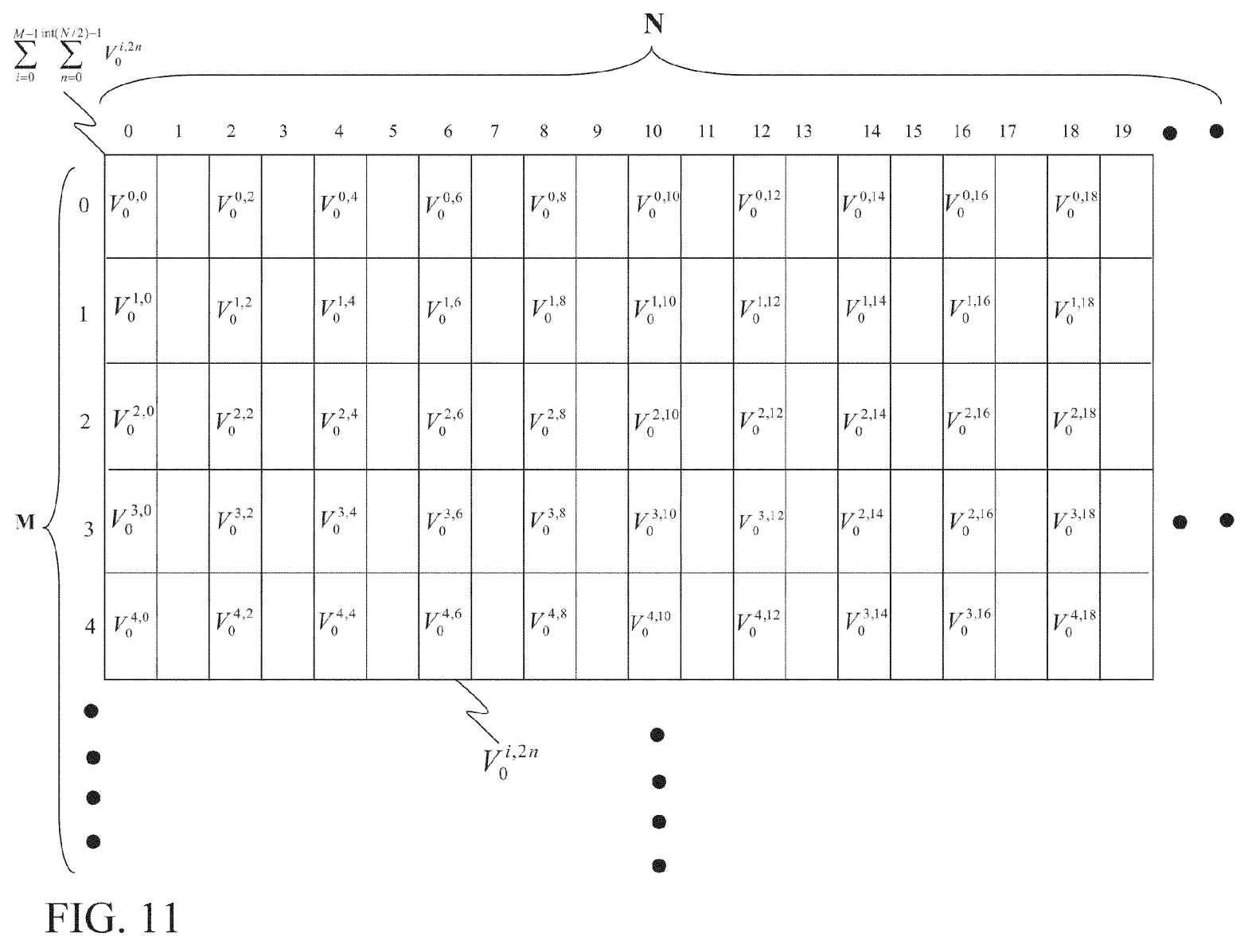

(as shown in FIG. 11) and $$\sum_{i=0}^{M-1} \sum_{n=0}^{int(N/2)-1} V_1^{i,2n+1}$$

Figure 1:
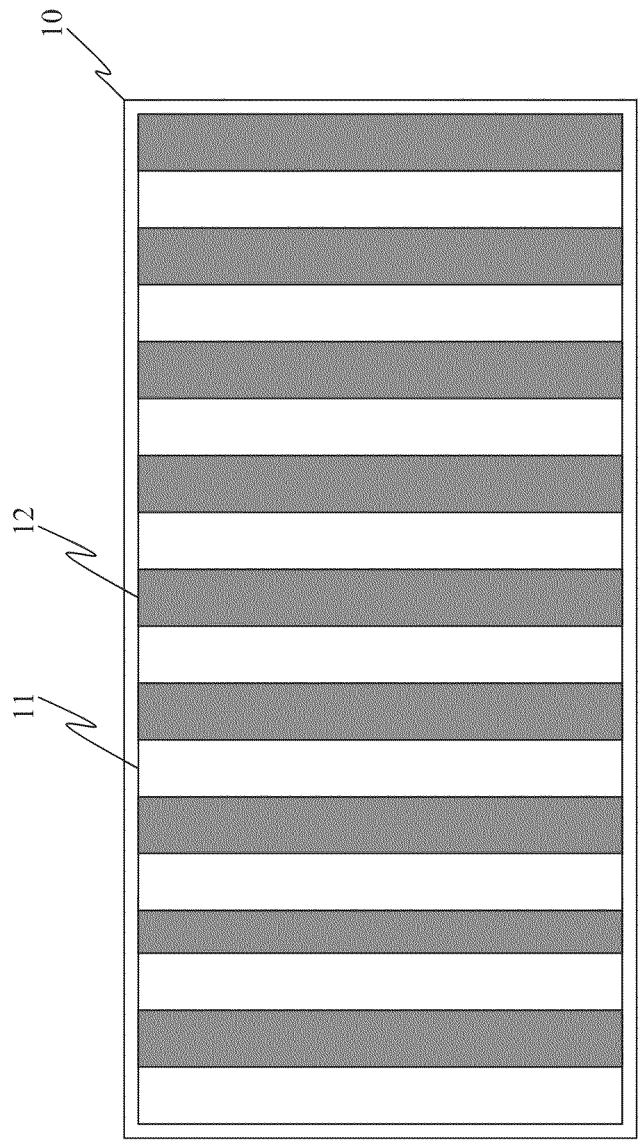
FIG. 1 is a schematic view of a vertical strip parallax barrier in the prior art.
Figure 2:
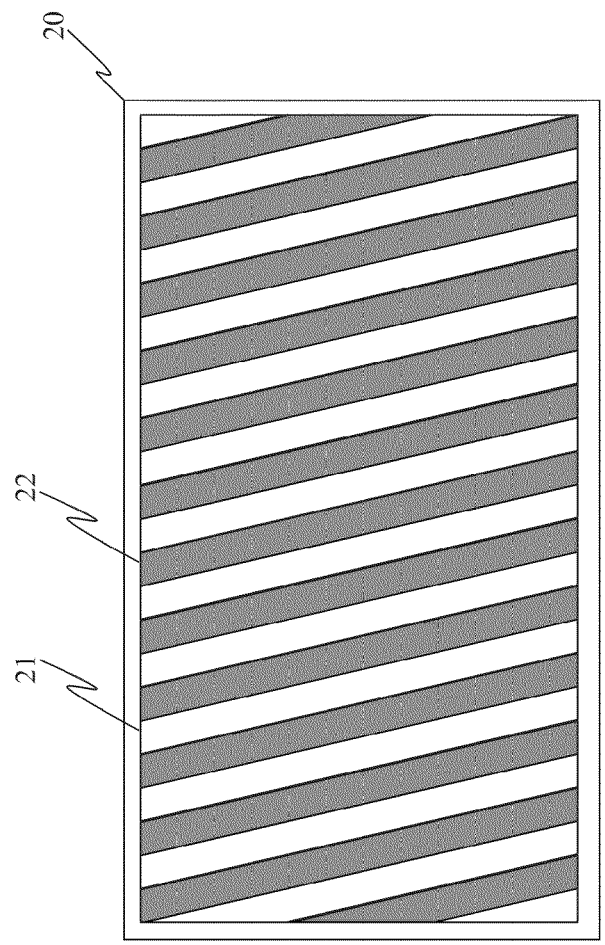
FIG. 2 is a schematic view of a slant-and-strip parallax barrier in the prior art.
Figure 3:
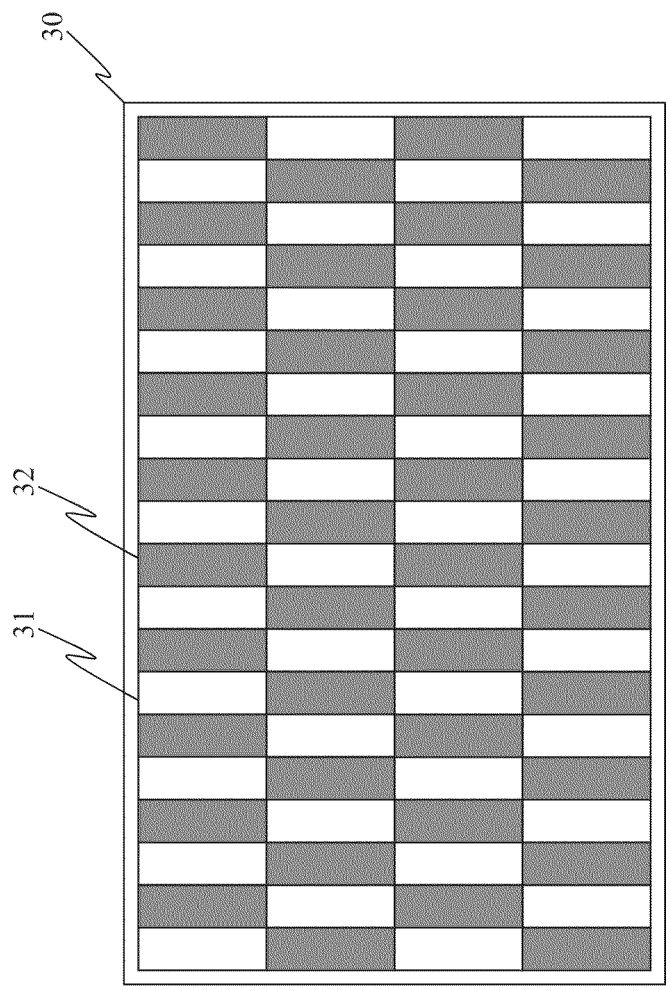
FIG. 3 is a schematic view of a slant-and-step parallax barrier in the prior art.
Figure 4:
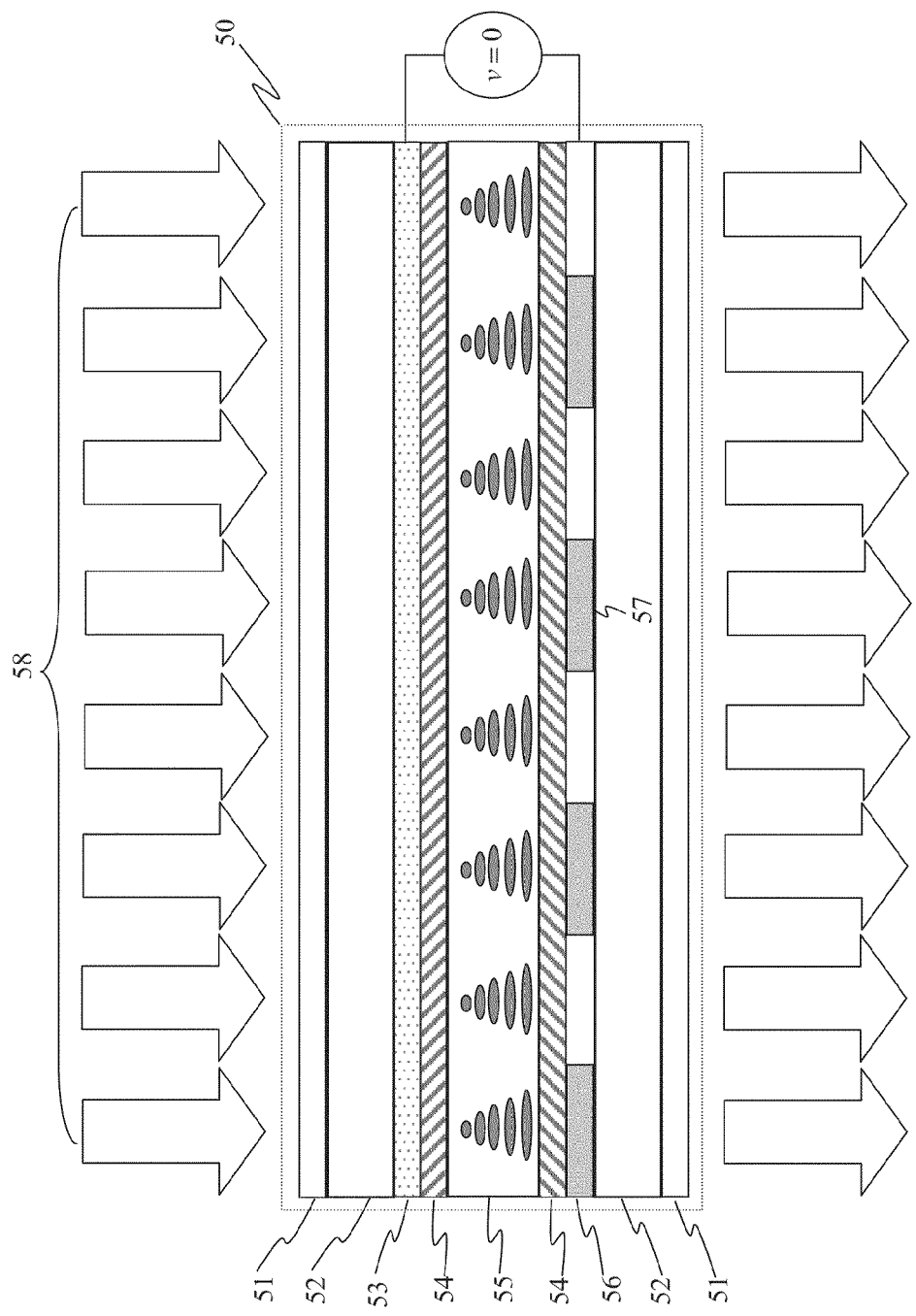
FIG. 4 is a schematic view of structure of a liquid crystal parallax barrier in the prior art.
Figure 5:
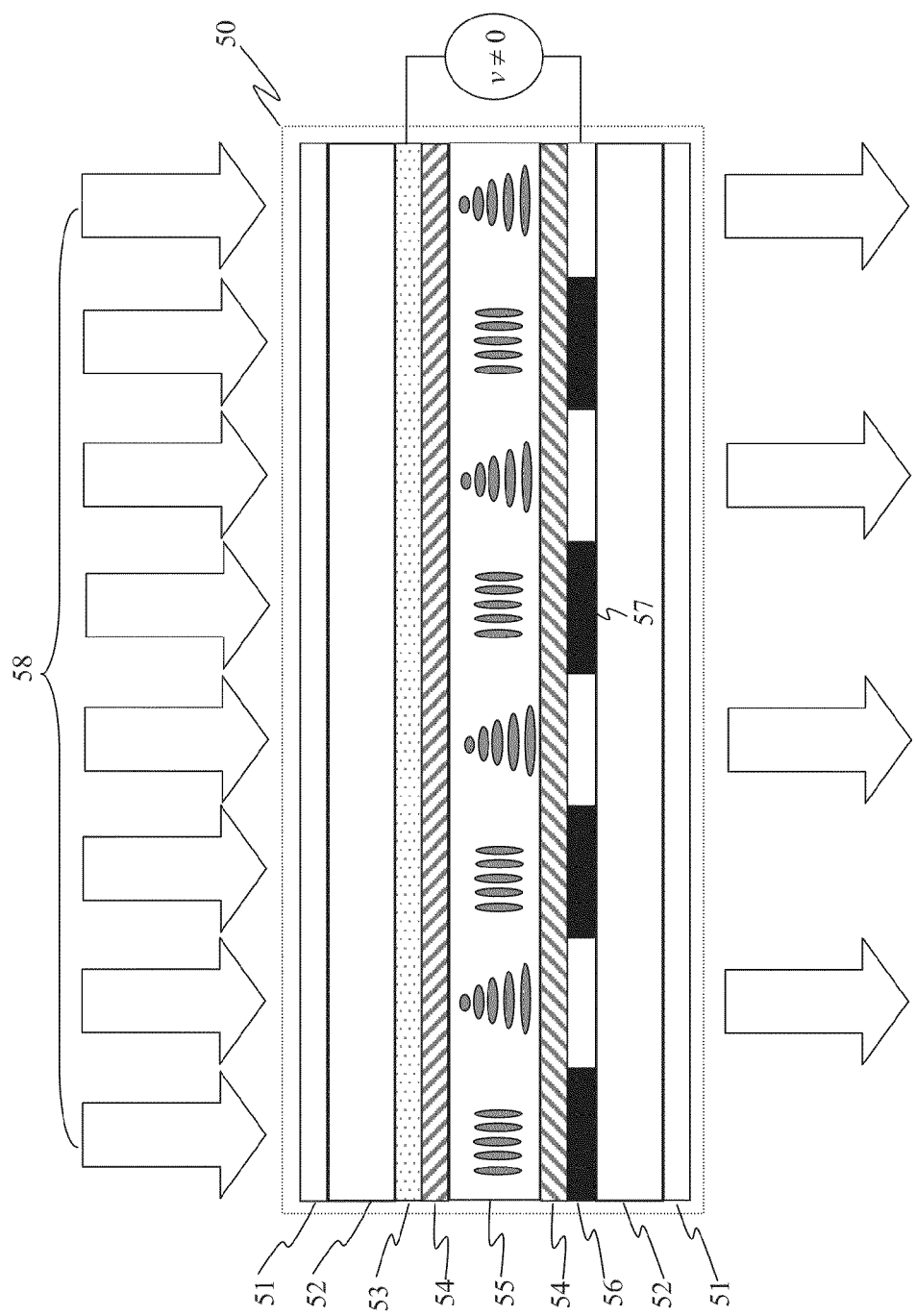
FIG. 5 is a schematic view of a shielding function of a liquid crystal parallax barrier in the prior art.
Figure 6:
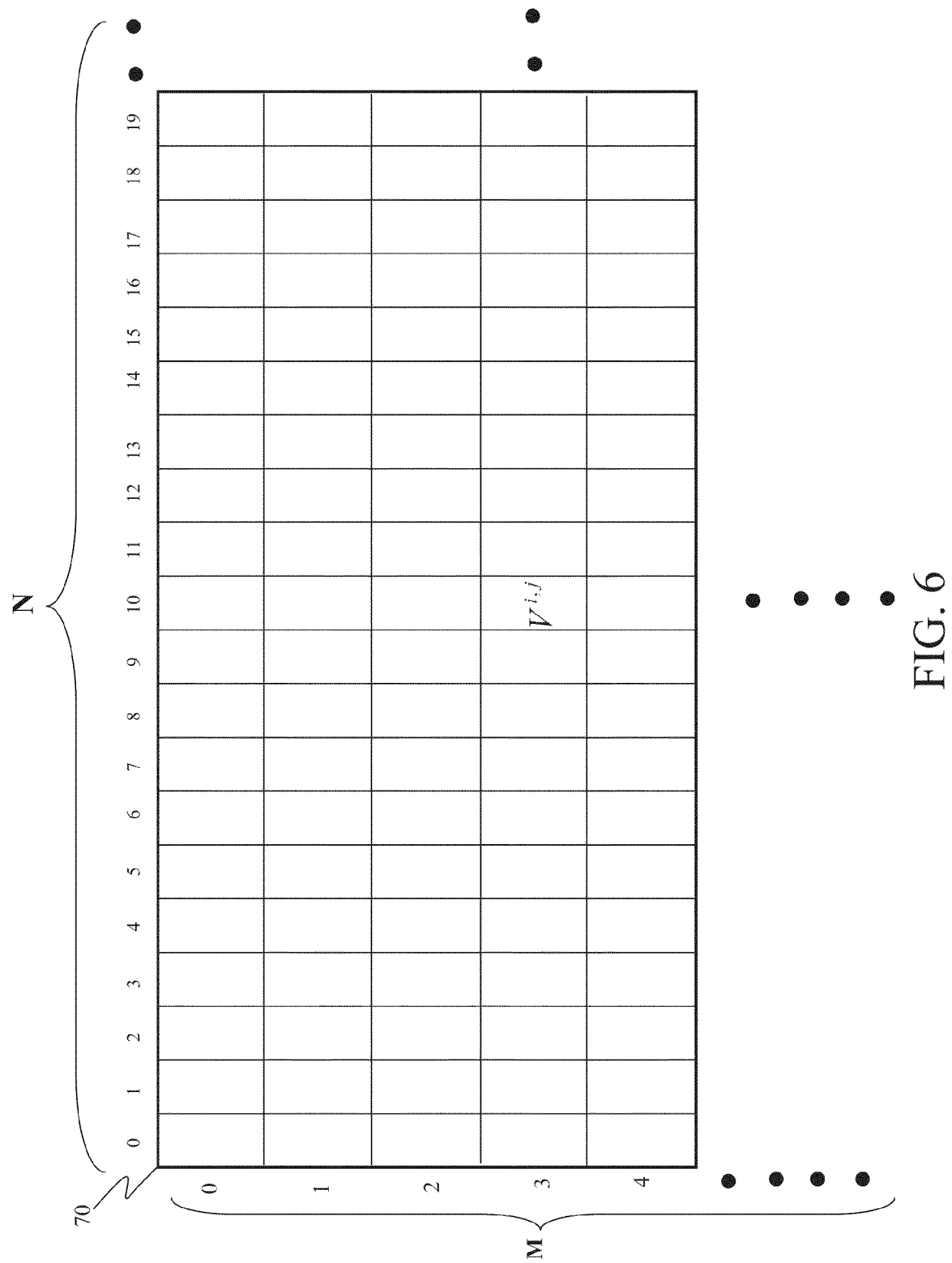
FIG. 6 is a schematic view of consisting of a full-screen image in the prior art.
Figure 10:
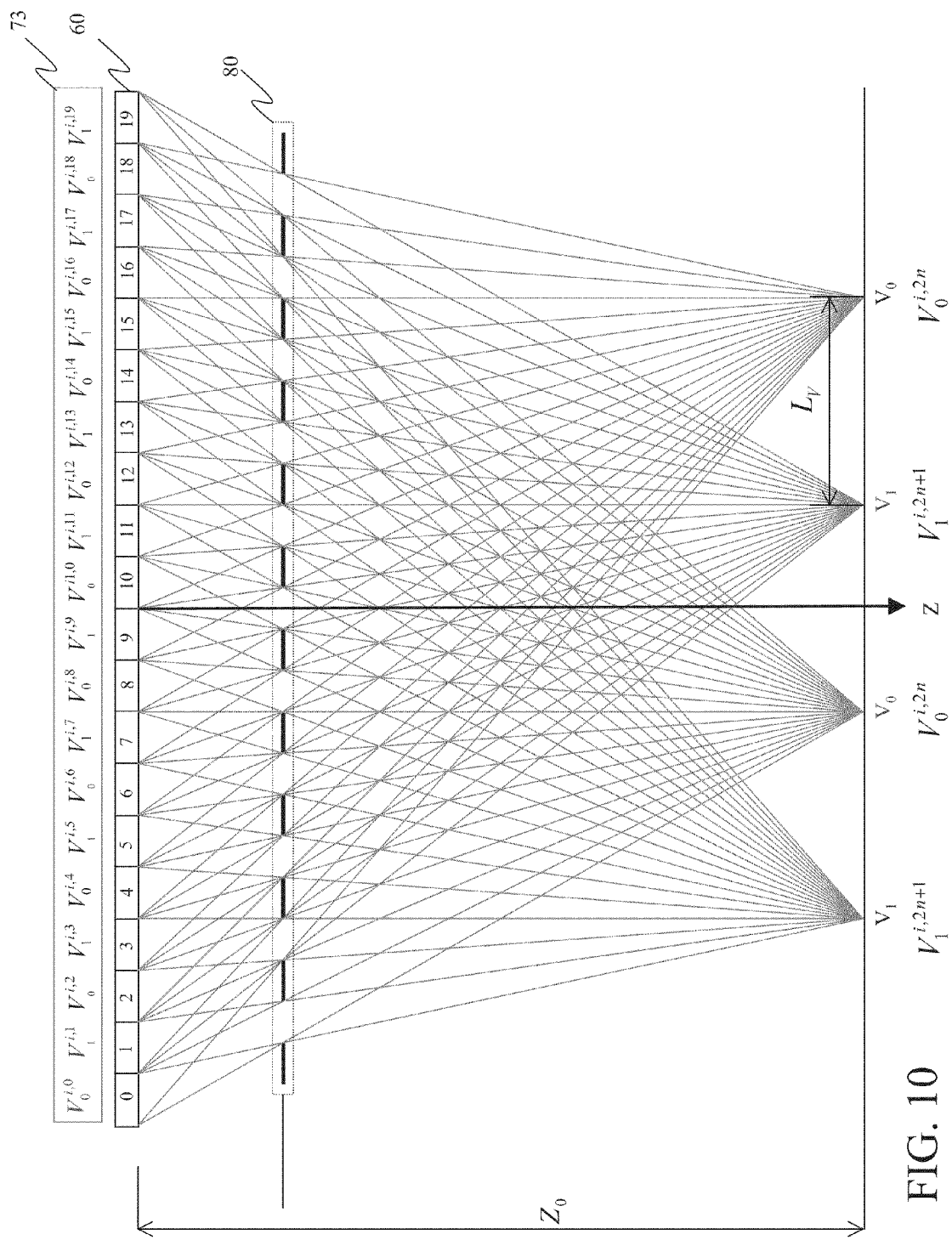
FIG. 10 is a schematic view of a separation function on a double-view image.
Figure 12:
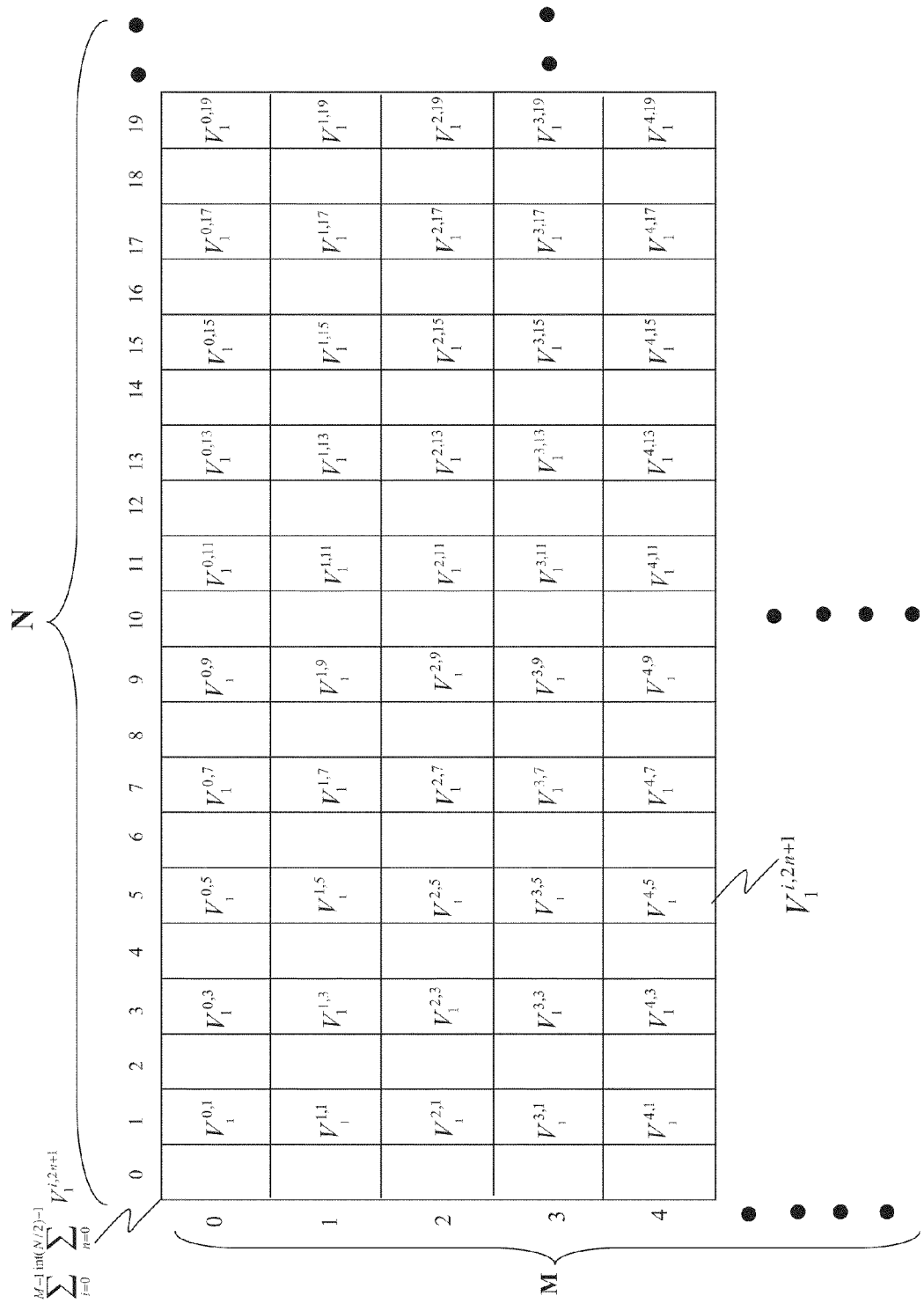

(as shown in FIG. 12) having a half-screen resolution at the optimal viewing positions $V_0$, $V_1$ respectively.

Figure 22:
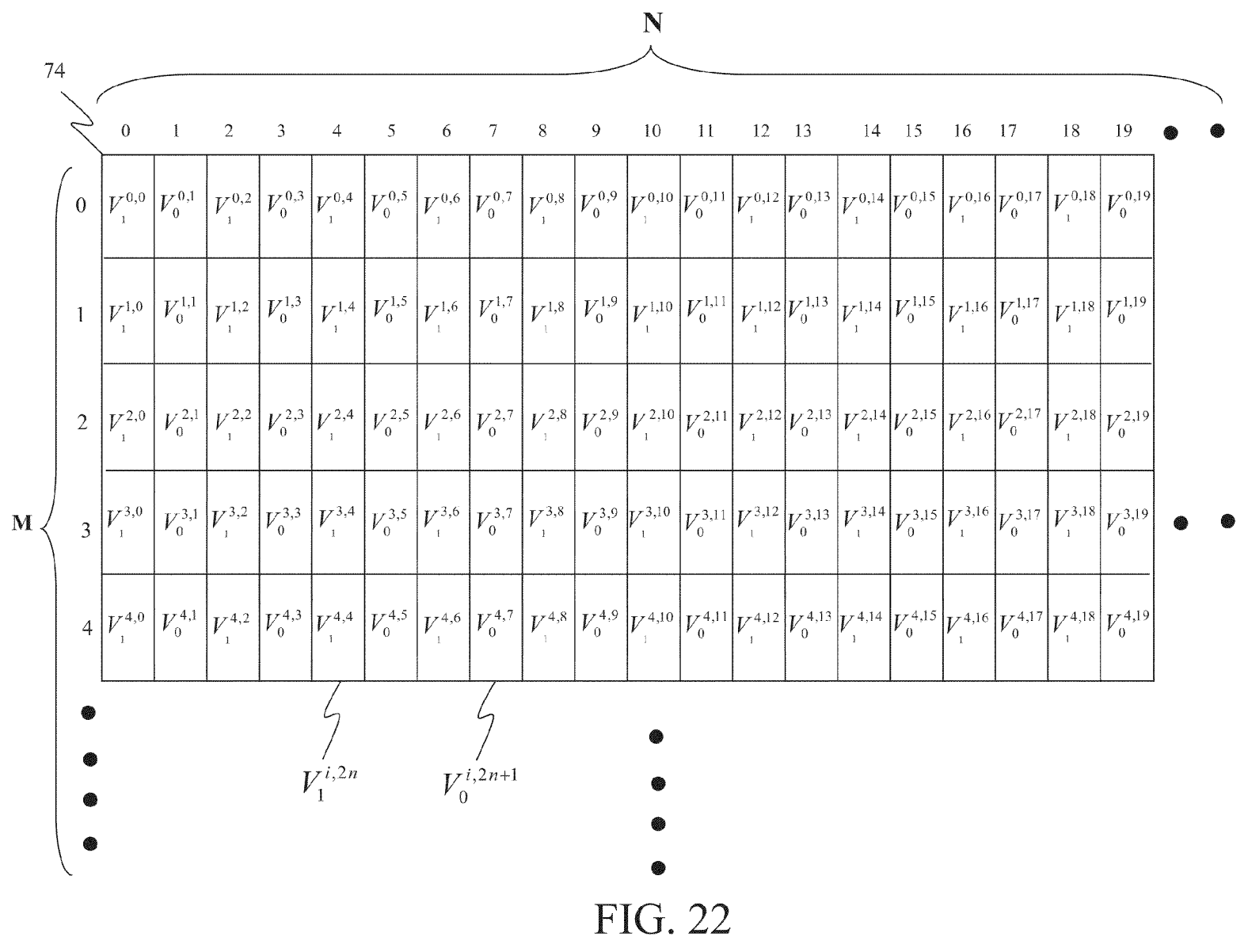

As shown in FIG. 21, when $t=T_1$, another double-view combined image 74 ($\Sigma_1(t)$) displayed on the screen 60, as shown in FIG. 22, is formed by the odd-numbered column images $V_0^{i,2n+1}$ of the left-view image 71 and the even-numbered column images $V_1^{i,2n}$ of the right-view image 72, and the consisting of the double-view combined image 74 is expressed by the following formula:

$$\Sigma_1(t) = \sum_{i=0}^{M-1} \sum_{n=0}^{int(N/2)-1} [V_0^{i,2n+1} + V_1^{i,2n}] \qquad (3)$$

Since the double-view vertical strip dynamic liquid crystal parallax barrier device is in the $T_1$ barrier state 1001, the double-view combined image 74 is separated into the images $$\sum_{i=0}^{M-1} \sum_{n=0}^{int(N/2)-1} V_0^{i,2n+1}$$

Figure 23:
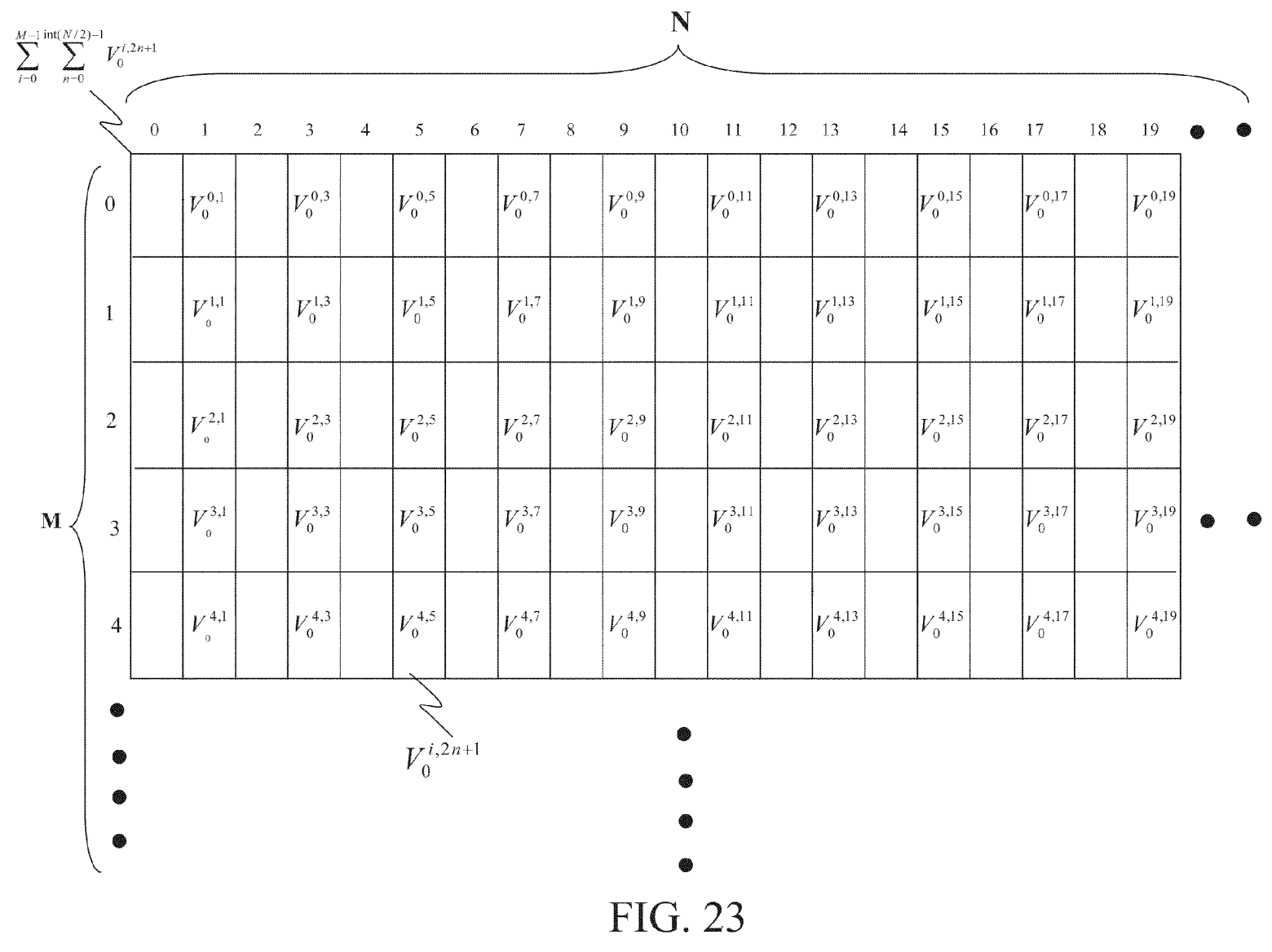

(as shown in FIG. 23) and $$\sum_{i=0}^{M-1} \sum_{n=0}^{int(N/2)-1} V_1^{i,2n}$$

Figure 24:
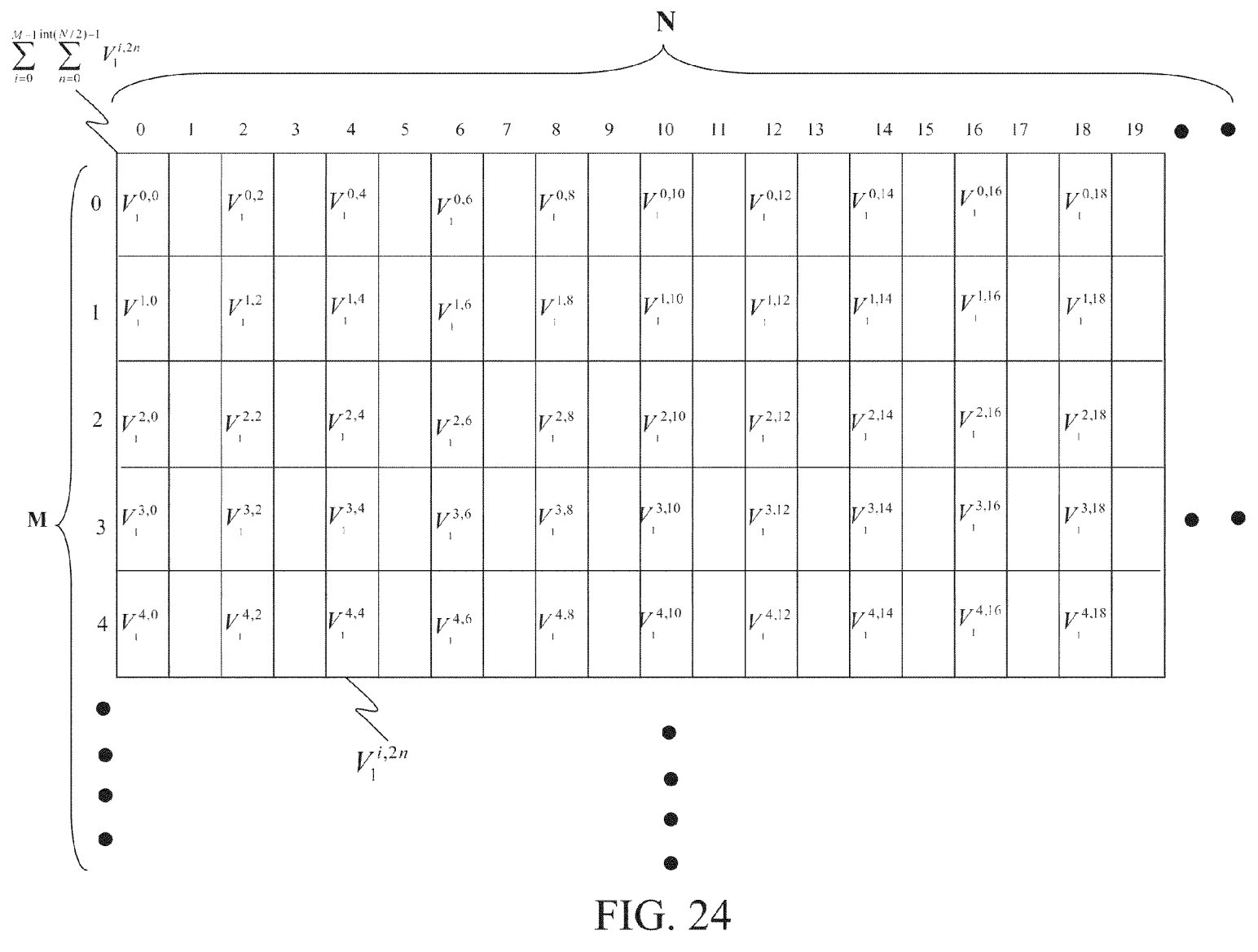

(as shown in FIG. 24) having a half-screen resolution at the optimal viewing positions $V_0$, $V_1$ respectively. For simplifying illustration and drawings, the symbols $$\sum_{i=0}^{M-1} \sum_{n=0}^{int(N/2)-1}$$

are omitted in the mathematical expressions of the image consisting.

Figure 25:
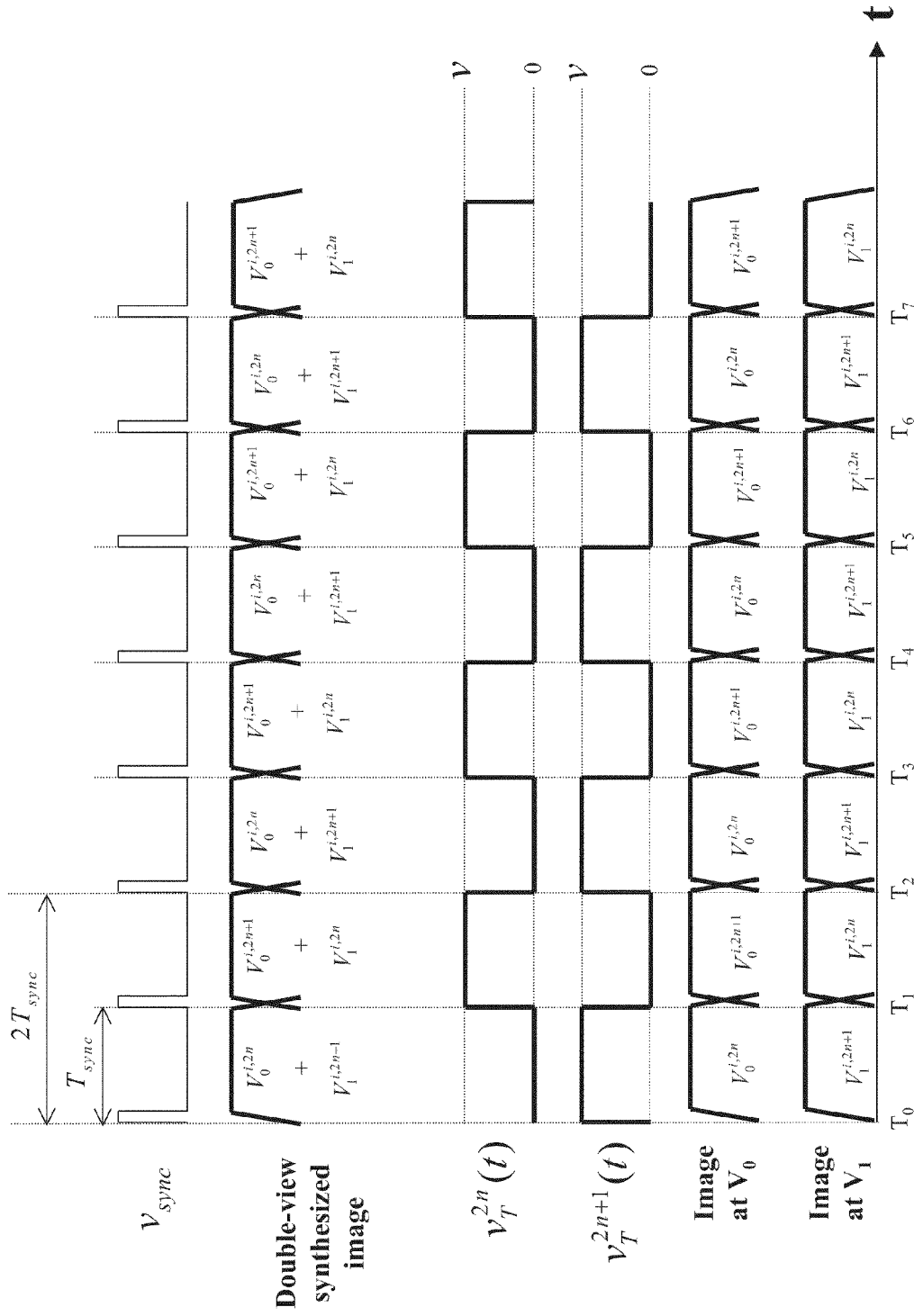
FIG. 25 is a schematic view of a display time sequence of a double-view vertical strip dynamic liquid crystal parallax barrier device.

FIG. 25 is a schematic view of a display time sequence of a double-view vertical strip dynamic liquid crystal parallax barrier device. In view of the above, when a common flat panel display is used to display a 3D image, by taking the advantage of a time sequence of the vertical synchronization scanning signal $v_{sync}$ (having a time period of $T_{sync}$), two double-view combined images 73 ($\Sigma_0(t)$) and 74 ($\Sigma_1(t)$) are alternately displayed and the electrodes $B_{2n}$ and $B_{2n+1}$ are alternately driven in a manner of synchronizing a vertical synchronization scanning signal $v_{sync}$, so as to provide the 3D image with the full-screen resolution at the optimal viewing positions $V_0$, $V_1$.

That is to say, when $t=T_0, T_2, T_4, T_6, \ldots$, for the double-view combined image 73 ($\Sigma_0(t)$) displayed on the screen 60, the electrode $B_{2n}$ is driven by a voltage $v_T^{2n}(t)=0$ and the electrode $B_{2n+1}$ is driven by a voltage $v_T^{2n+1}(t)=v$, so that the double-view image combined 73 is separated into images $V_0^{i,2n}$, $V_1^{i,2n+1}$ having a half-screen resolution at the optimal viewing positions $V_0$, $V_1$ respectively.

When $t=T_1, T_3, T_5, T_7, \ldots$, for the double-view combined image 74 ($\Sigma_1(t)$) displayed on the screen 60, the electrode $B_{2n}$ is driven by $v_T^{2n}(t)=v$ and the electrode $B_{2n+1}$ is driven by $v_T^{2n+1}(t)=0$, so that the double-view image 74 is separated into images $V_0^{i,2n+1}$, $V_1^{i,2n}$ having a half-screen resolution at the optimal viewing positions $V_0$, $V_1$ respectively.

In view of the above, as long as the two double-view combined images 73, 74 are switched and the electrodes $B_{2n}$, $B_{2n+1}$ are driven alternately in sync with a period of $T_{sync}$, the 3D images $V_0^{i,2n}+V_0^{i,2n+1}$, $V_1^{i,2n+1}+V_1^{i,2n}$ having the full-screen resolution can be respectively provided at the optimal viewing positions $V_0$, $V_1$ in a time period of $2T_{sync}$. $2T_{sync}$ is set to be the displaying period of a 3D image with full-screen resolution, so that the display of the 3D image having the full-screen resolution is achieved by continuously and repetitively displaying the double-view combined image and driving the electrodes with a voltage in the period of $2T_{sync}$.

Figure 26:
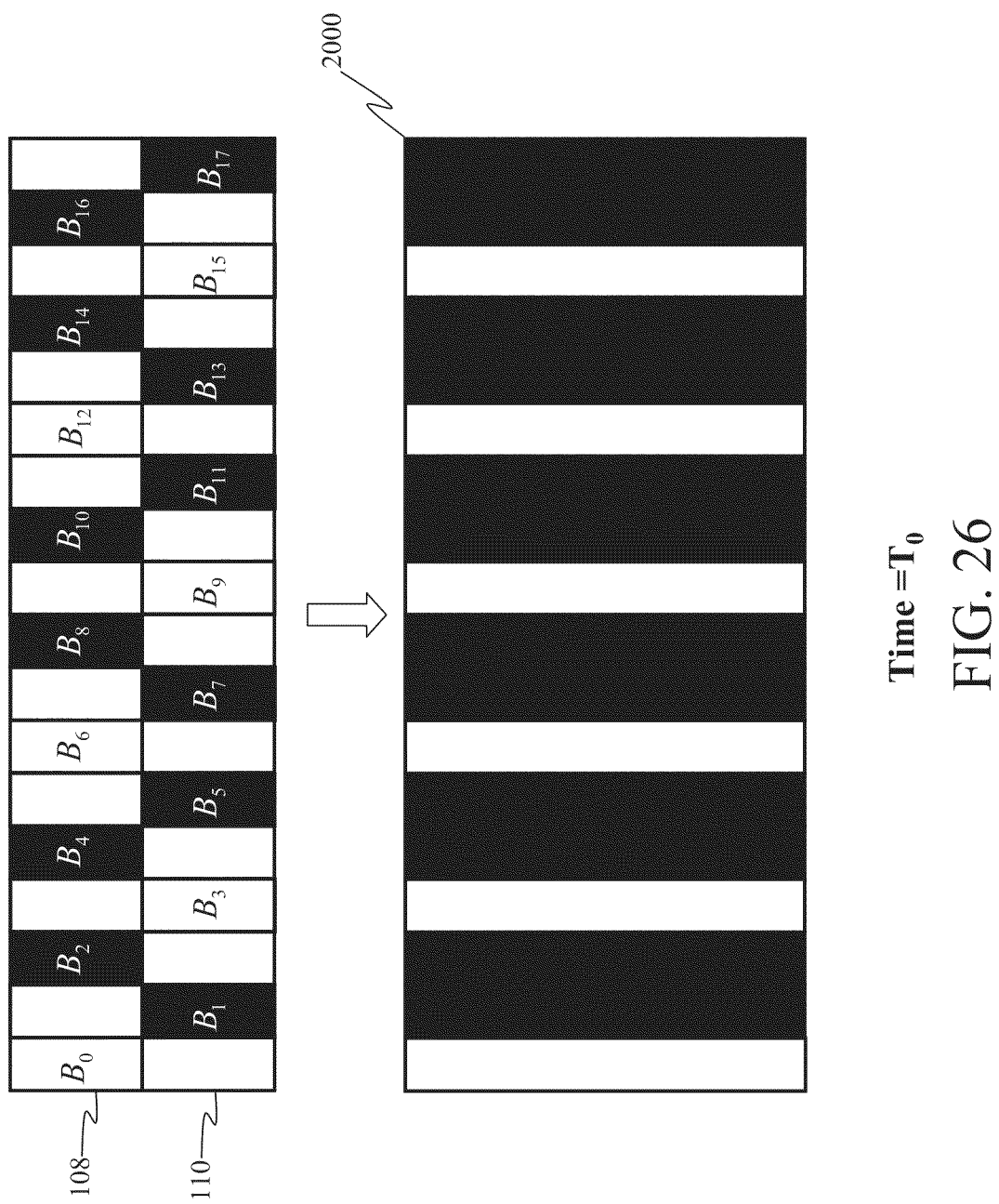
FIG. 26 to FIG. 28 are schematic views of electrode functions of a three-view vertical strip dynamic liquid crystal parallax barrier device.
Figure 27:
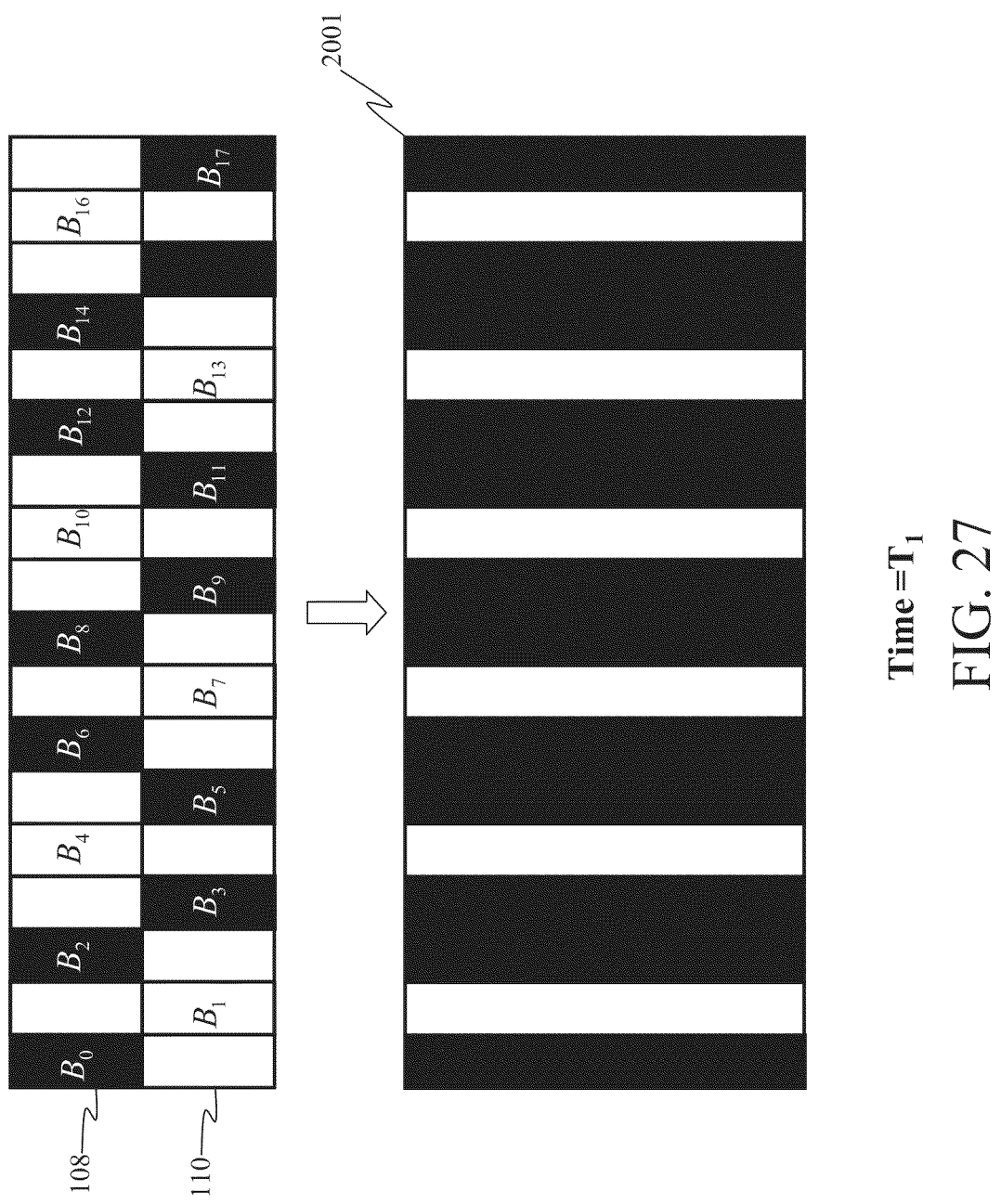
Figure 28:
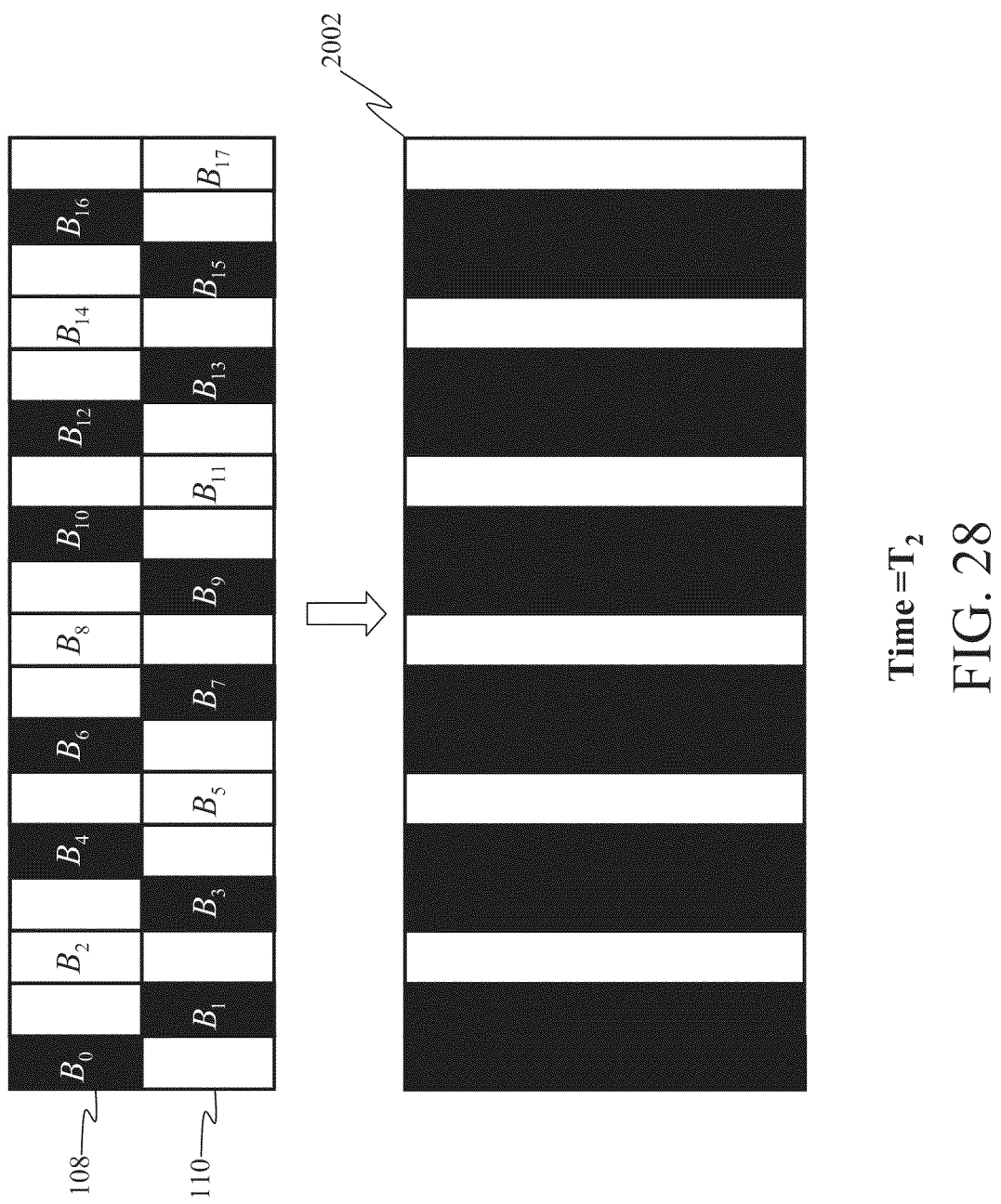

FIG. 26 to FIG. 28 are schematic views of electrode functions of a three-view vertical strip dynamic liquid crystal parallax barrier device.

As shown in FIG. 26, when $t=T_0$, the electrode $B_{3n}$ is in the non-voltage driving state (where n is a positive integer including 0), and the other electrodes $B_{3n+1}$, $B_{3n+2}$ are in the voltage driving state. Therefore, the light-transmissive effect is presented at the electrode $B_{3n}$ and the shielding effect is presented at the other electrodes $B_{3n+1}$, $B_{3n+2}$, and this optical state is referred to as a $T_0$ barrier state 2000 hereinafter.

As shown in FIG. 27, when $t=T_1$, the electrode $B_{3n+1}$ is in the non-voltage driving state, and the other electrodes $B_{3n}$, $B_{3n+2}$ are in the voltage driving state. Therefore, the light-transmissive effect is presented at the electrode $B_{3n+1}$ and the shielding effect is presented at the other electrodes $B_{3n}$, $B_{3n+2}$, and this optical state is referred to as a $T_1$ barrier state 2001 hereinafter.

As shown in FIG. 28, when $t=T_2$, the electrode $B_{3n+2}$ is in the non-voltage driving state, and the other electrodes $B_{3n}$, $B_{3n+1}$ are in the voltage driving state. Therefore, the light-transmissive effect is presented at the electrode $B_{3n+2}$ and the shielding effect is presented at the other electrodes $B_{3n}$, $B_{3n+1}$, and this optical state is referred to as a $T_2$ barrier state 2002 hereinafter.

Figure 29:
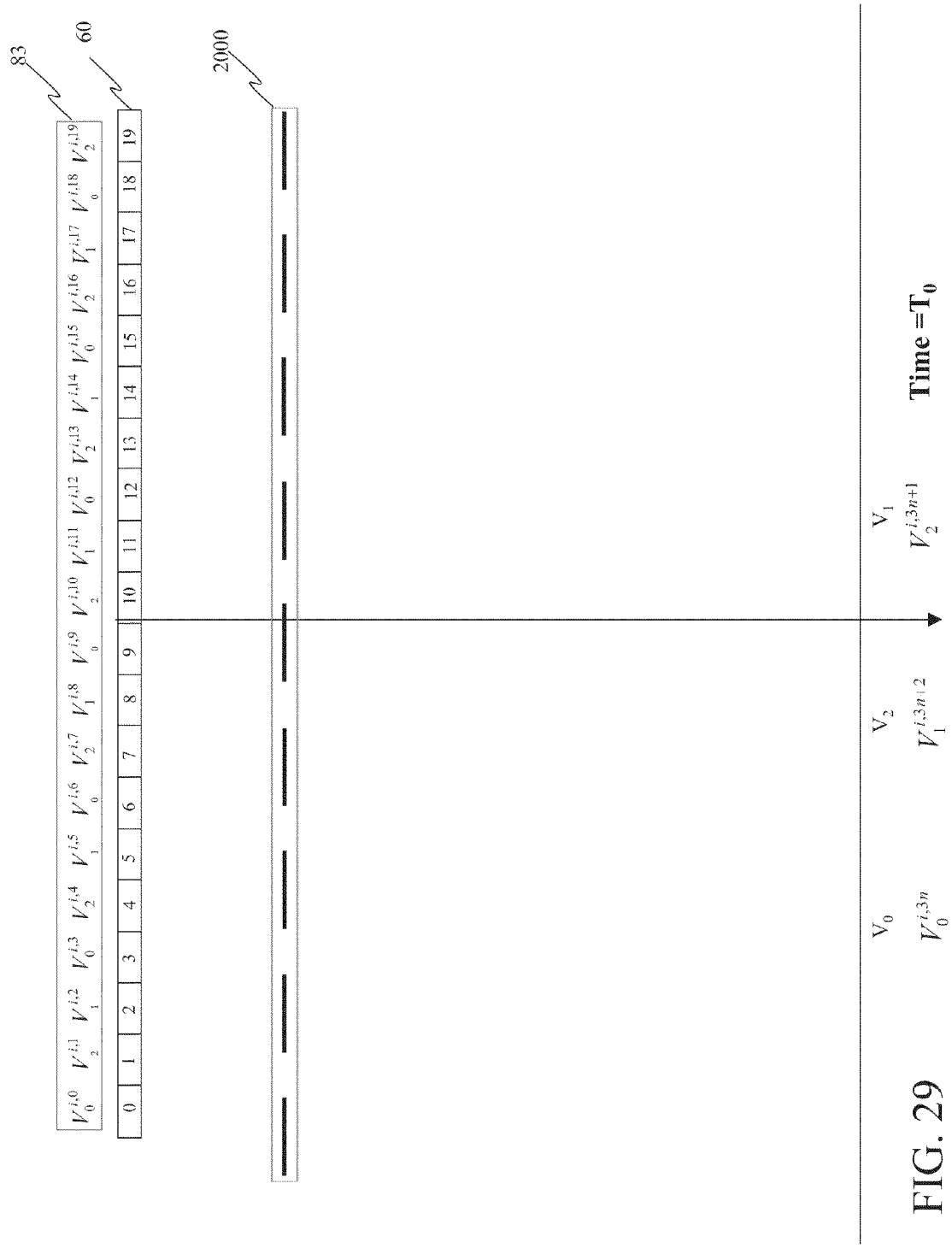
FIG. 29 to FIG. 31 are schematic views of 3D image display of a three-view vertical strip dynamic liquid crystal parallax barrier device.
Figure 30:
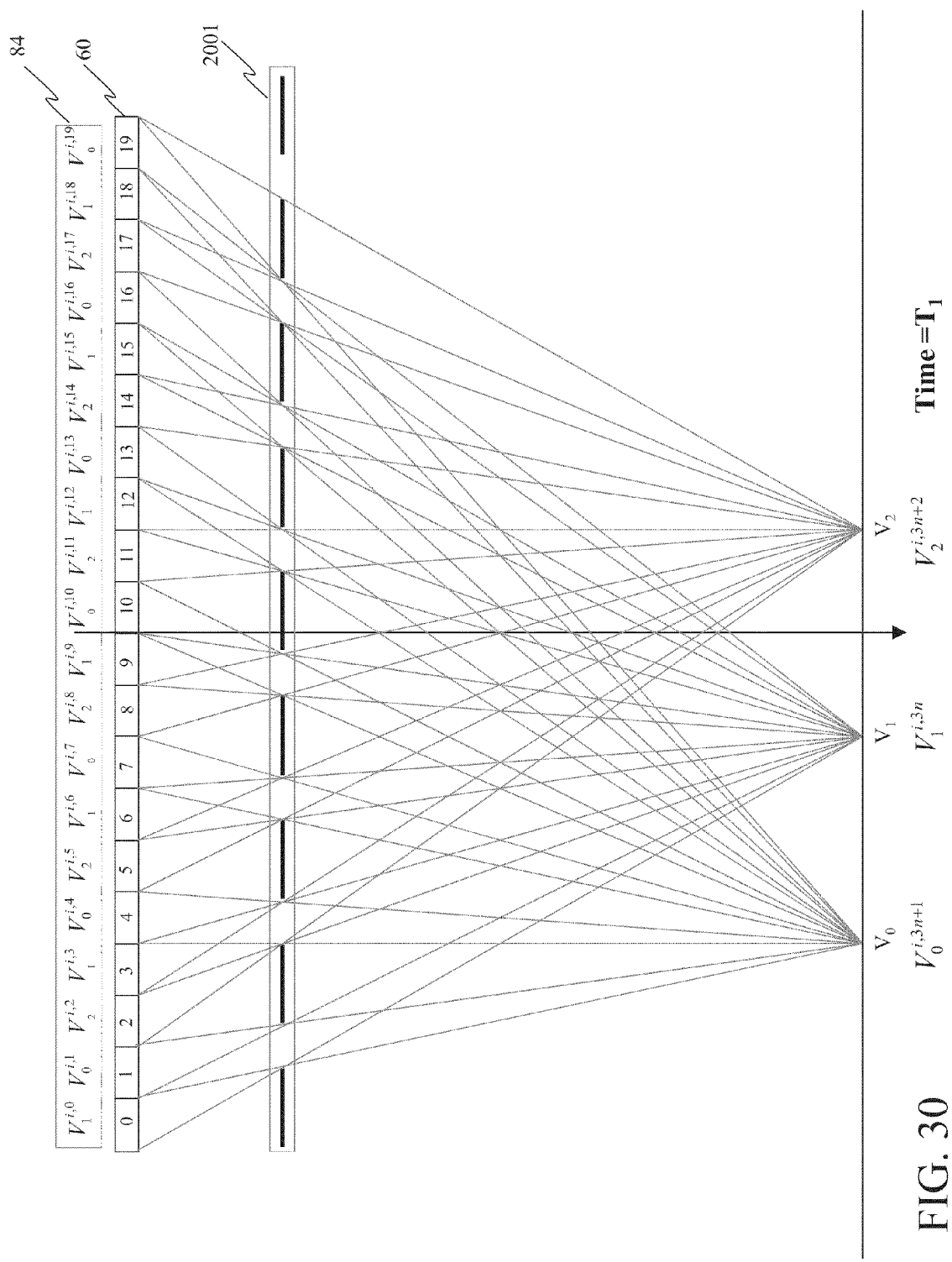
Figure 31:
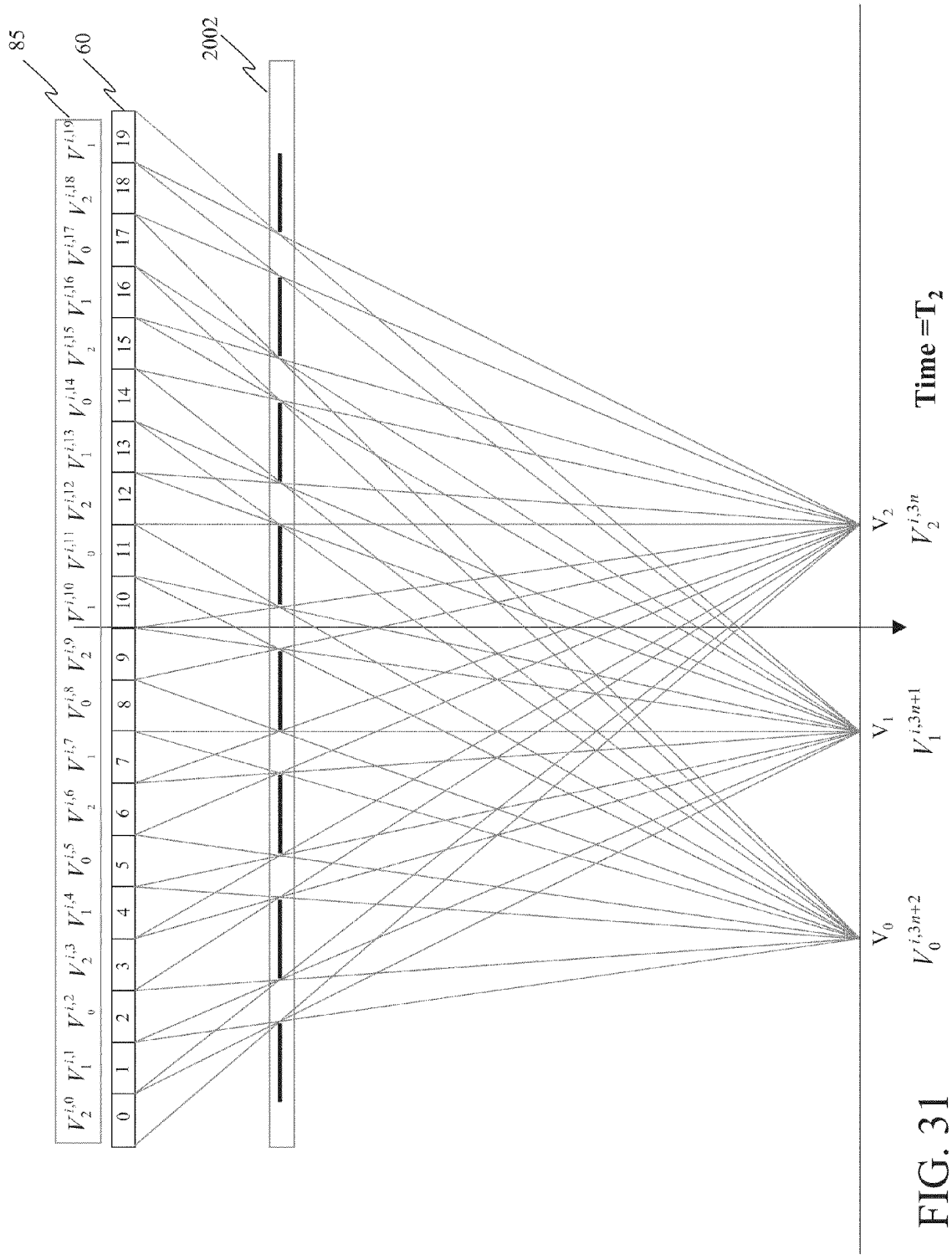

FIG. 29 to FIG. 31 are schematic views of 3D image display of a three-view vertical strip dynamic liquid crystal parallax barrier device.

As shown in FIG. 29, when $t=T_0$, for the three-view combined image 83 (i.e., $V_0^{i,3n}+V_1^{i,3n+2}+V_2^{i,3n+1}$) displayed on the screen 60, since the three-view vertical strip dynamic liquid crystal parallax barrier device is in the $T_0$ barrier state 2000, the three-view image 83 is separated into images $V_0^{i,3n}$, $V_1^{i,3n+2}$, $V_2^{i,3n+1}$ having a one-third-screen resolution at the optimal viewing positions $V_0$, $V_1$, $V_2$ respectively.

As shown in FIG. 30, when $t=T_1$, for the three-view combined image 84 (i.e., $V_0^{i,3n+1}+V_1^{i,3n}+V_2^{i,3+2}$) displayed on the screen 60, since the three-view vertical strip dynamic liquid crystal parallax barrier device is in the $T_1$ barrier state 2001, the three-view image 84 is separated into images $V_0^{i,3n+1}, V_1^{i,3n}, V_2^{i,3n+2}$ having a one-third-screen resolution at the optimal viewing positions $V_0, V_1, V_2$ respectively.

As shown in FIG. 31, when $t=T_2$, for the three-view combined image 85 (i.e., $V_0^{i,3+2}+V_1^{i,3n+1}+V_2^{i,3n}$) displayed on the screen 60, since the three-view vertical strip dynamic liquid crystal parallax barrier device is in the $T_2$ barrier state 2002, the three-view combined image 84 is separated into images $V_0^{i,3n+2}, V_1^{i,3n+1}, V_2^{i,3n}$ having a one-third-screen resolution at the optimal viewing positions $V_0, V_1, V_2$ respectively.

Figure 32:
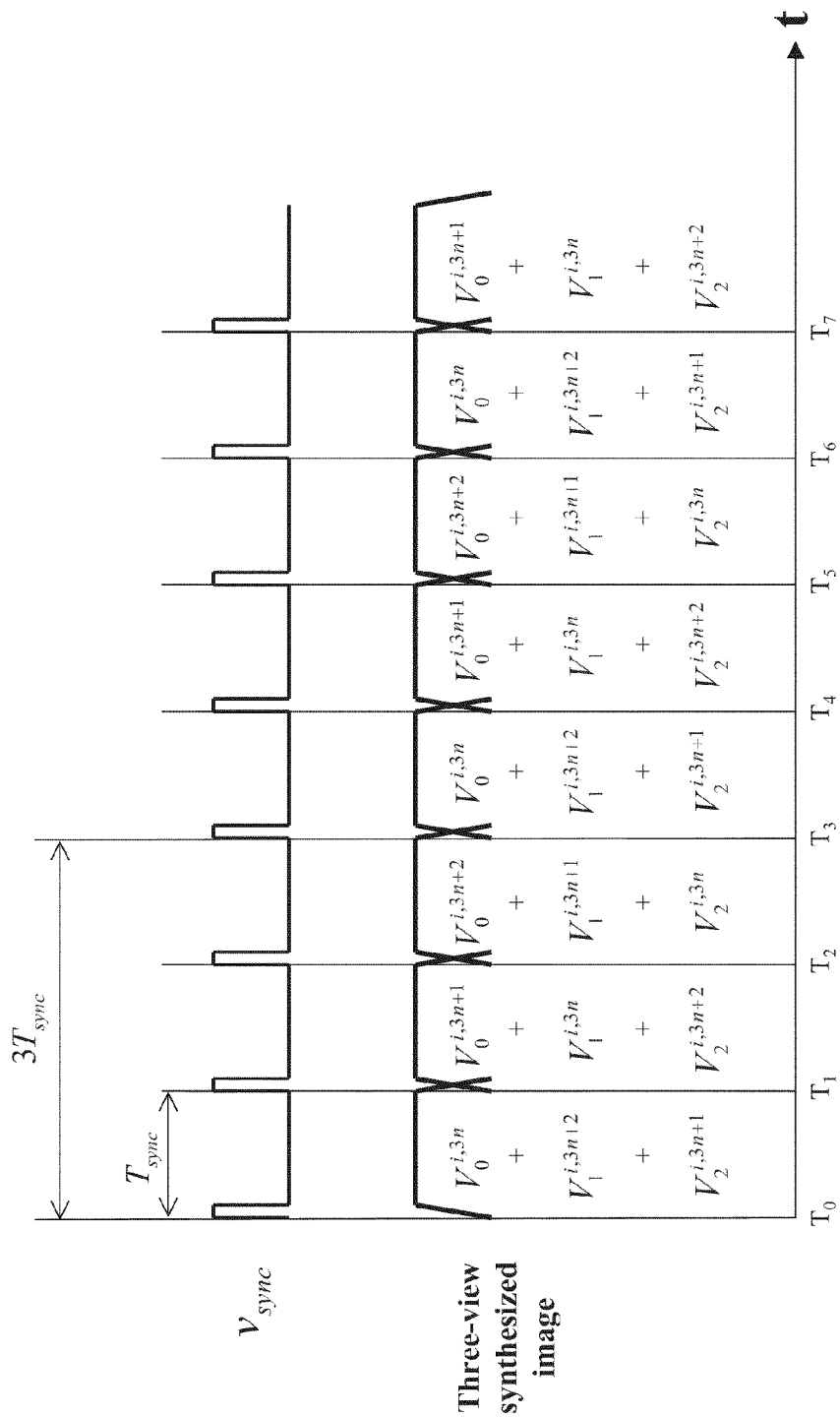
FIG. 32 and FIG. 33 are schematic views of a display time sequence of a three-view vertical strip dynamic liquid crystal parallax barrier device.
Figure 33:
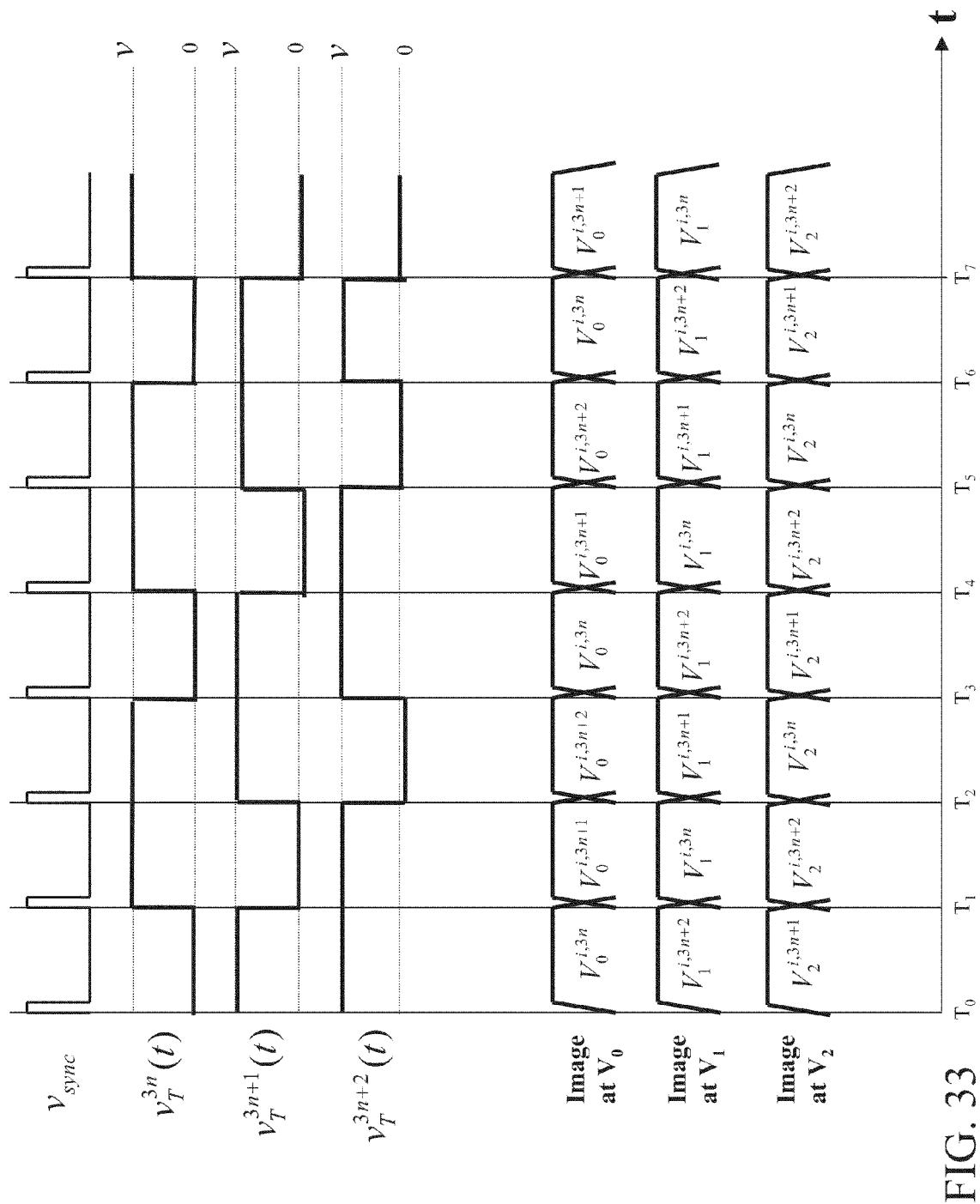

FIG. 32 and FIG. 33 are schematic views of a display time sequence of a three-view vertical strip dynamic liquid crystal parallax barrier device. In view of the above, when a common flat panel display is used to display a 3D image, by taking the advantage of a time sequence of the vertical synchronization scanning signal $v_{sync}$ (having a time period of $T_{sync}$), the three-view combined image 83 (i.e., $V_0^{i,3n}+V_1^{i,3n+2}+V_2^{i,3n+1}$), 84 (i.e., $V_0^{i,3+1}+V_1^{i,3n}+V_2^{i,3n+2}$), and 85 (i.e., $V_0^{i,3n+2}+V_1^{i,3n+2}+V_2^{i,3n}$) are alternately displayed, and the electrodes $B_{3n}, B_{3n+1}, B_{3n+2}$ are alternately driven by proper voltages $v_T^{3n}(t), v_T^{3n+1}(t), v_T^{3n+2}(t)$ in a manner of synchronizing a vertical synchronization scanning signal $v_{sync}$, so as to provide the 3D images $V_0^{i,3n}+V_0^{i,3n+1}+V_0^{i,3n+2}, V_1^{i,3n+2}+V_1^{i,3n}+V_1^{i,3n+1}, V_2^{i,3n+1}+V_2^{i,3n+2}+V_2^{i,3n}$ having the full-screen resolution at the optimal viewing positions $V_0, V_1, V_2$ in a time period of $3T_{sync}$. $3T_{sync}$ is set to be the displaying period of a 3D image with the full-screen resolution, so that the display of the 3D image having the full-screen resolution is achieved by continuously and repetitively displaying the three-view combined image and driving the electrodes with a voltage in the period of $3T_{sync}$.

In view of the above, according to different numbers of views (the number of views is set to be No), the parallax barrier is used to display the 3D image having the full-screen resolution, and in the displaying period of the full-screen 3D image (i.e., $No \times T_{sync}$), the multi-view combined image $\Sigma_T(t)$ and the driving voltage $v_T^m(t)$ of each electrode are expressed by the following function:

$$\Sigma_T(t) = \sum_{i=0}^{M-1} \sum_{n=0}^{int(N/No)-1} \sum_{k=0}^{No-1} V_k^{i,n \times No + Mod\left(\frac{T-k}{No}\right)} \qquad (4)$$

where k is an index of the views, t is time, T is an acting time point, and the values thereof are determined by the following relation:

$$T = \text{Mod}\left(\text{int}\left(\frac{t}{T_{sync}}\right)/No\right) \qquad (5)$$

where int is a rounding function, Mod is a remainder function, and thus T is a positive integer of 0 to (No−1); when T−k<0, the Mod function has the following relation:

$$\text{Mod}\left(\frac{t-k}{No}\right) = \text{Mod}\left(\frac{No+t-k}{No}\right) \qquad (6)$$

Therefore, the method of generating and displaying different multi-view combined images at different acting time points T according to Formulas (4) to (6) is referred to as the multi-view image dynamic combination and display procedure hereinafter. That is to say, the multi-view combined image of the present invention is a function of the time T. In addition, when the barrier electrode has a slant-and-strip parallax barrier structure or a slant-and-step parallax barrier structure, the multi-view combined image $\Sigma_T(t)$ can be expressed by the following formula:

$$\Sigma_T(t) = \sum_{i=0}^{M-1} \sum_{n=0}^{int(N/No)-1} \sum_{k=0}^{No-1} V_k^{i,n \times No + Mod\left(\frac{i+T-k}{No}\right)} \qquad (7)$$

where when $i+T-k<0$, the Mod function has the following relation:

$$\text{Mod}\left(\frac{i+T-k}{No}\right) = \text{Mod}\left(\frac{No+i+T-k}{No}\right) \qquad (8)$$

In addition, the values of the driving voltage $v_T^m(t)$ of all the electrodes are determined by the following relations:

$$v_T^m(t)=0, \text{ when } T-\text{Mod}(m/No)=0 \qquad (9)$$

$$v_T^m(t)=v, \text{ when } T-\text{Mod}(m/No)\neq 0 \qquad (10)$$

where m is an index of the electrode, T is determined by Formula (5), and v is a driving voltage.

Therefore, according to Formulas (9) and (10), the method of generating different electrode driving voltages at different acting time points T is referred to as the barrier electrode dynamic driving procedure hereinafter. That is to say, the driving voltage of all the electrodes of the present invention is a function of the time T. In addition, as described above, when the light polarization directions of the upper and lower linear polarizers 101, 112 are in a parallel state, the driving voltage $v_T^m(t)$ of each electrode is an inverse function of Formulas (9) and (10), that is:

$$v_T^m(t)=v, \text{ when } T-\text{Mod}(m/No)=0 \qquad (11)$$

$$v_T^m(t)=0, \text{ when } T-\text{Mod}(m/No)\neq 0 \qquad (12)$$

Figure 34:
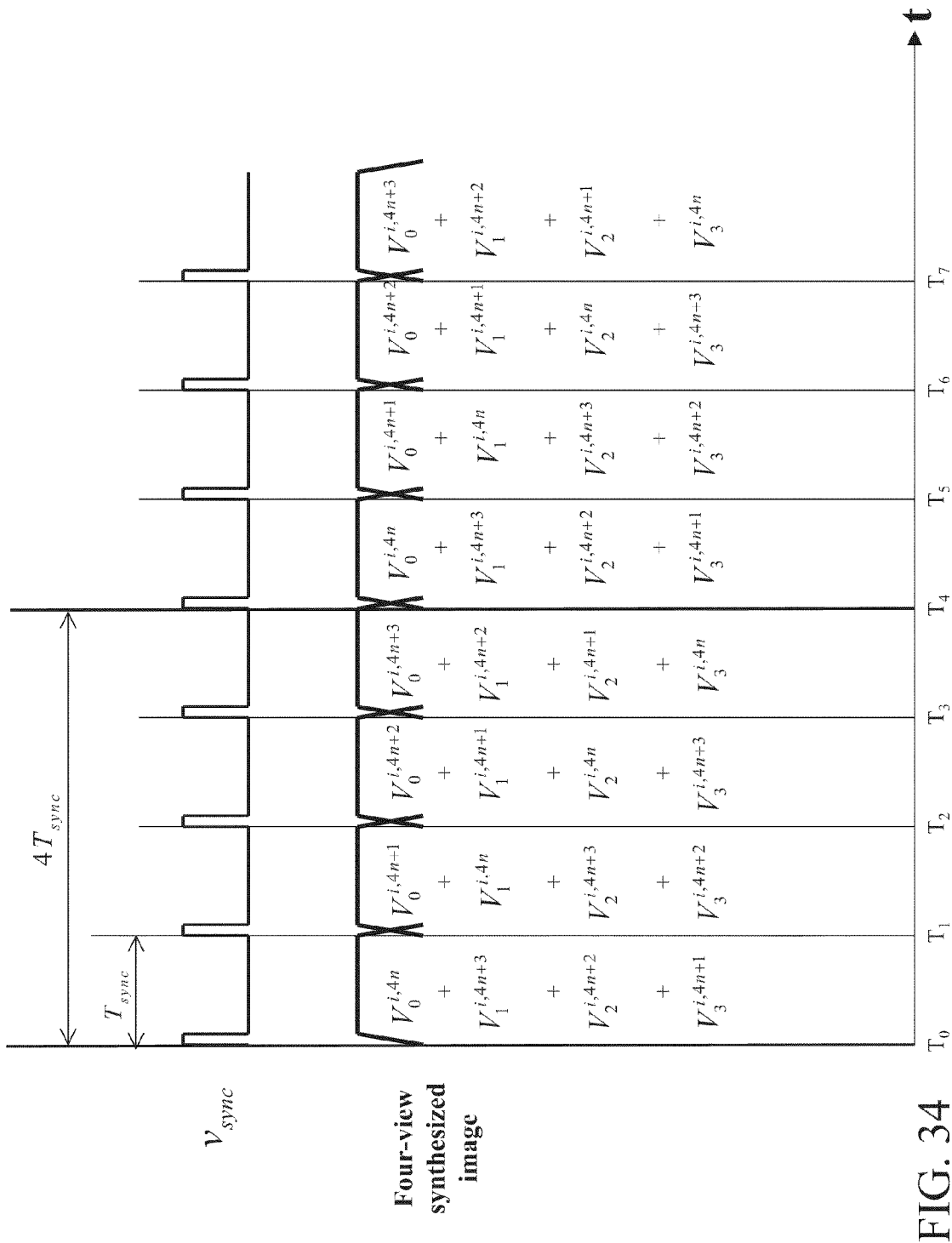
FIG. 34 and FIG. 35 are diagrams of a display time sequence of a four-view vertical strip dynamic liquid crystal parallax barrier device.
Figure 35:
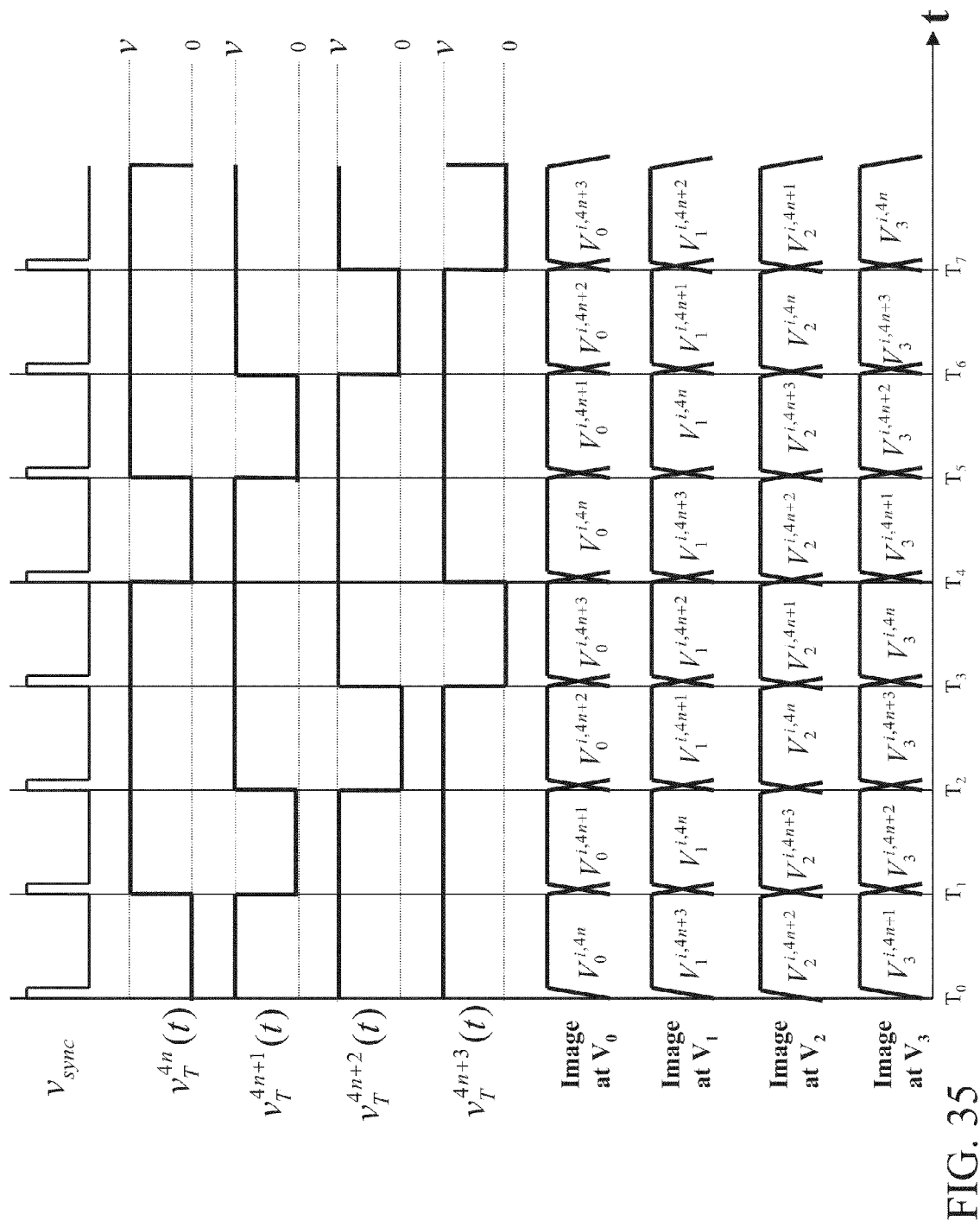

FIG. 34 and FIG. 35 are schematic views of a display time sequence of a four-view vertical strip dynamic liquid crystal parallax barrier device drawn according to Formulas (4), (9), and (10). The single-view images of the four-view image are set to be $$\sum_{i=0}^{M-1} \sum_{j=0}^{N-1} V_0^{i,j},$$

$$\sum_{i=0}^{M-1} \sum_{j=0}^{N-1} V_1^{i,j},$$

-continued $$\sum_{i=0}^{M-1} \sum_{j=0}^{N-1} V_2^{i,j},$$

$$\sum_{i=0}^{M-1} \sum_{j=0}^{N-1} V_3^{i,j}$$

respectively. In the displaying period of the full-screen 3D image (i.e., $4T_{sync}$) and at the acting time points of $t=T_0$, $T_1$, $T_2$, $T_3$ (i.e., $T=0, 1, 2, 3$), the consisting of the four-view combined image can be expressed by the following mathematical expressions:

$$\Sigma_0(t) = \sum_{i=0}^{M-1} \sum_{n=0}^{int(N/4)-1} [V_0^{i,4n} + V_1^{i,4n+3} + V_2^{i,4n+2} + V_3^{i,4n+1}]$$

$$\Sigma_1(t) = \sum_{i=0}^{M-1} \sum_{n=0}^{int(N/4)-1} [V_0^{i,4n+1} + V_1^{i,4n} + V_2^{i,4n+3} + V_3^{i,4n+2}]$$

$$\Sigma_2(t) = \sum_{i=0}^{M-1} \sum_{n=0}^{int(N/4)-1} [V_0^{i,4n+2} + V_1^{i,4n+1} + V_2^{i,4n} + V_3^{i,4n+3}]$$

$$\Sigma_3(t) = \sum_{i=0}^{M-1} \sum_{n=0}^{int(N/4)-1} [V_0^{i,4n+3} + V_1^{i,4n+2} + V_2^{i,4n+1} + V_3^{i,4n}]$$

Further, according to the characteristics of Formulas (9) and (10), the driving voltage $v_T^m(t)$ of each electrode can be divided into four types according to the index of the electrode, i.e., $v_T^{4n}(t)$, $v_T^{4n+1}(t)$, $v_T^{4n+2}(t)$, $v_T^{4+3}(t)$, where n is a positive integer including 0. At the acting time points $T=0, 1, 2, 3$, the driving voltage $v_T^{4n}(t)$ for the electrode having an index of 4n is 0, v, v, v; the driving voltage $v_T^{4n+1}(t)$ for the electrode having an index of 4n+1 is v, 0, v, v; the driving voltage $v_T^{4n+2}(t)$ for the electrode having an index of 4n+2 is v, v, 0, v; and the driving voltage $v_T^{4n+3}(t)$ for the electrode having an index of 4n+3 is v, v, v, 0.

Therefore, at the acting time points $T=0, 1, 2, 3$, for the four-view combined images $\Sigma_0(t), \Sigma_1(t), \Sigma_2(t), \Sigma_3(t)$ displayed on the screen, when the electrodes are driven by the voltages of $v_T^{4n}(t)$, $v_T^{4n+1}(t)$, $v_T^{4n+2}(t)$, $v_T^{4n+3}(t)$, the 3D images $V_0^{i,4n}+V_0^{i,4n+1}+V_0^{i,4n+2}+V_0^{i,4n+3}$, $V_1^{i,4n+3}+V_1^{i,4n}+V_1^{i,4n+1}$, $V_1^{i,4n+2}$, $V_2^{i,4n+2}+V_2^{i,4n+3}+V_2^{i,4n}+V_2^{i,4n+1}$, $V_3^{i,4n+1}+V_3^{i,4n+2}+V_3^{i,4n+3}+V_3^{i,4n}$ having the full-screen resolution can be provided at the optimal viewing points $V_0, V_1, V_2, V_3$ respectively.

Second Embodiment

Figure 36:
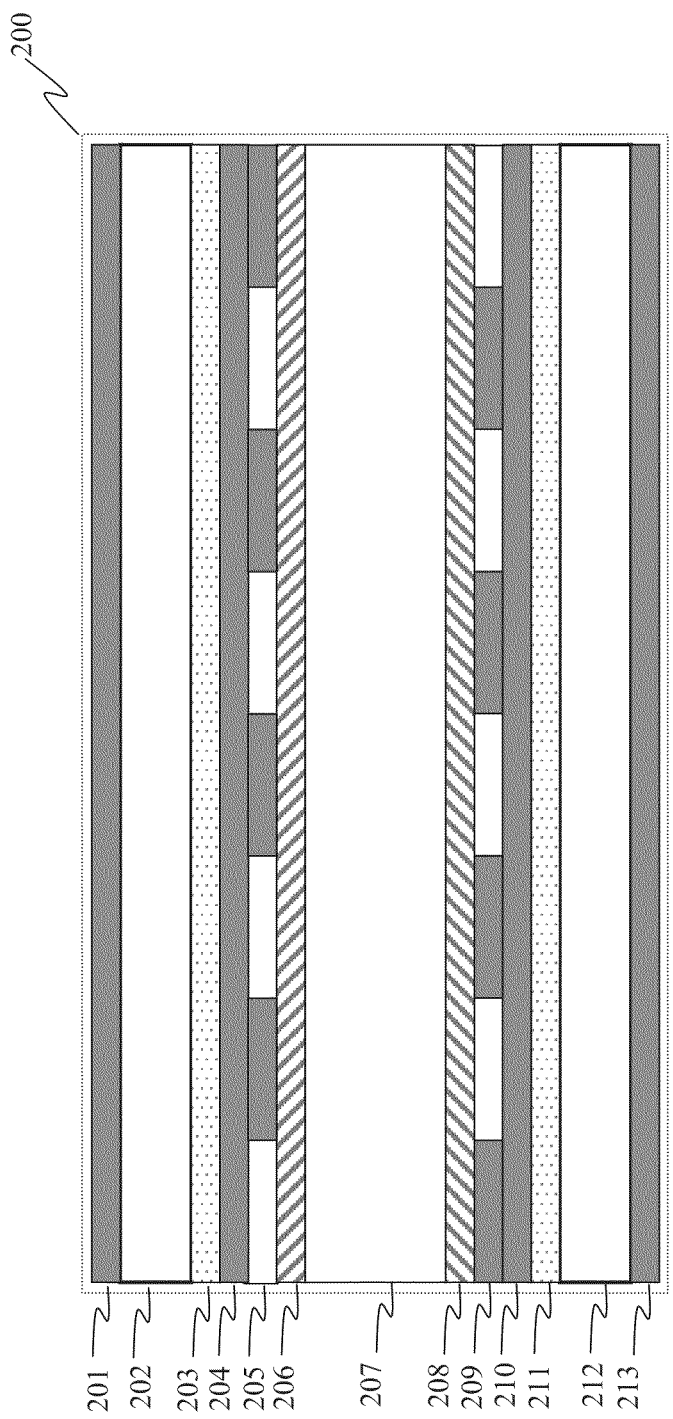
FIG. 36 is a schematic view of structure of a dynamic liquid crystal parallax barrier device according to a second embodiment of the present invention.
Figure 37:
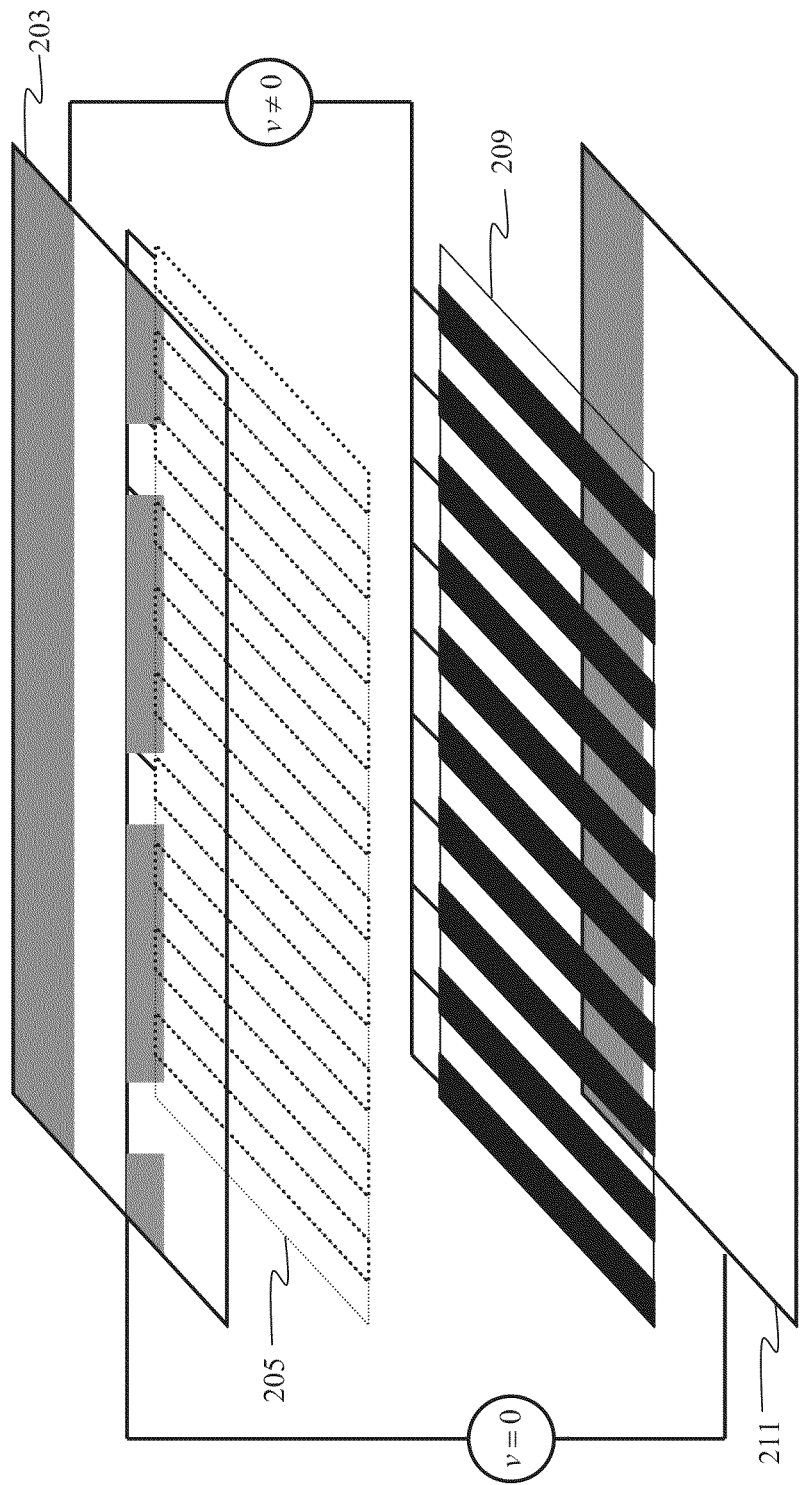
FIG. 37 to FIG. 38 are schematic views of electrical connection of an upper and a lower barrier electrode layer and an upper and a lower common electrode layer according to the second embodiment of the present invention.
Figure 38:
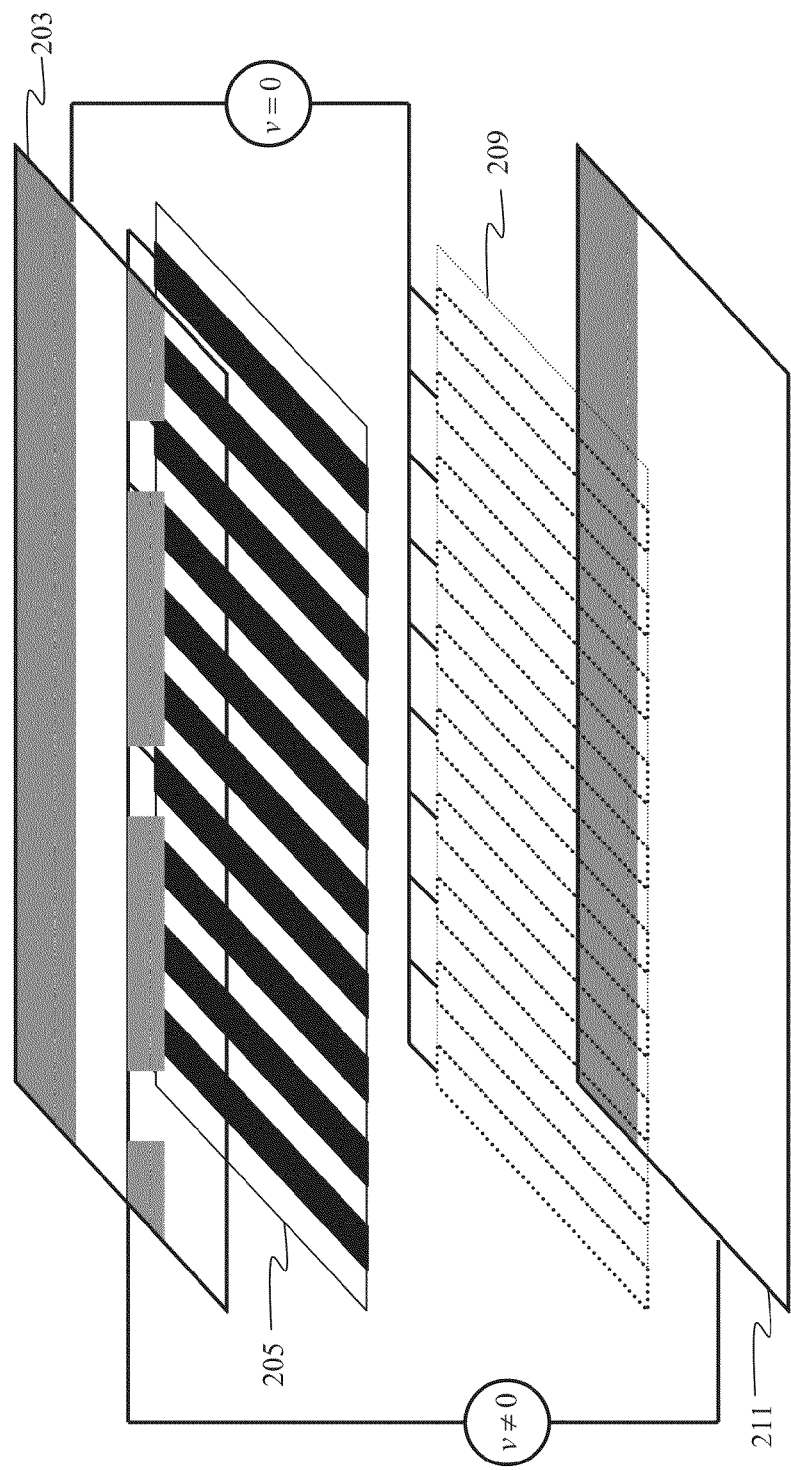

FIG. 36 is a schematic view of structure of a dynamic liquid crystal parallax barrier device according to a second embodiment of the present invention. The dynamic liquid crystal parallax barrier device 200 mainly consists of an upper linear polarizer 201, an upper transparent substrate 202, an upper common electrode layer 203, an upper insulation layer 204, an upper barrier electrode layer 205, an upper alignment layer 206, a liquid crystal molecular layer 207, a lower alignment layer 208, a lower barrier electrode layer 209, a lower insulation layer 210, a lower common electrode layer 211, a lower transparent substrate 212, and a lower linear polarizer 213. The second embodiment has the same effect as the first embodiment, except that the upper barrier electrode layer 205 and the lower barrier electrode layer 209 are respectively disposed on different transparent substrates. In addition, for driving the upper and lower electrodes with a voltage, a common electrode layer and an insulation layer are added. As shown in FIG. 37 and FIG. 38, the upper barrier electrode layer 205 is electrically connected to the lower common electrode layer 211, and the lower barrier electrode layer 209 is electrically connected to the upper common electrode layer 203.

In view of the above, the full-screen 3D image display device of the present invention provides a dynamic liquid crystal parallax barrier device for solving the 3D image resolution deterioration problem caused by view separation of the multi-view 3D image displayed by the conventional parallax barrier, and displays the multi-view 3D image with a full-screen image resolution through the multi-view image dynamic combination and display procedure and the barrier electrode dynamic driving procedure, so as to achieve the purpose of optimal 3D image display.

What is claimed is:

1. A full-screen 3D image display device, comprising:
a flat panel display screen, for displaying a full-screen image according to a time sequence of an image scanning vertical synchronization signal having a period of $T_{sync}$, wherein the full-screen image is formed by M×N R, G, B sub-pixels, and the R, G, B sub-pixels are configured along a horizontal direction or a vertical direction;
a multi-view image, formed by No single-view images $V_k$ with a parallax effect, where k is an index of the single-view image and k is a positive integer of $0 \leq k \leq No-1$, and No is a positive integer of $No \geq 2$;
a multi-view image dynamic combination and display procedure, for combining the No single-view images $V_k$ at a plurality of acting time points T according to the time sequence of the image scanning vertical synchronization signal, so as to form a multi-view combined image $\Sigma_T(t)$, and synchronously display the multi-view combined image $\Sigma_T(t)$ on the flat panel display screen at each of said plurality acting time points T;
a barrier electrode dynamic driving procedure, for synchronously outputting a dynamic liquid crystal electrode driving voltage $v_T^m(t)$ on individual electrodes of the dynamic liquid crystal parallax barrier device at said plurality of acting time points T according to the time sequence of the image scanning vertical synchronization signal; and
a dynamic liquid crystal parallax barrier device, driven by the dynamic liquid crystal electrode driving voltage $v_T^m(t)$ to change an optical structure of a parallax barrier, performing view separation on the multi-view combined image $\Sigma_T(t)$ at each optimal viewing point, and providing a single-view image having a full-screen image resolution within a displaying period of a full-screen 3D image with a period of $No \times T_{sync}$.

2. The full-screen 3D image display device according to claim 1, wherein the dynamic liquid crystal parallax barrier device comprises an upper linear polarizer, an upper transparent substrate, a common electrode layer, an upper alignment layer, a liquid crystal molecular layer, a lower alignment layer, a pair of barrier electrode layers, a lower transparent substrate, and a lower linear polarizer.

3. The full-screen 3D image display device according to claim 2, wherein light polarization directions of the upper linear polarizer and the lower linear polarizer are perpendicular to each other or parallel to each other.

4. The full-screen 3D image display device according to claim 2, wherein the pair of barrier electrode layers comprise an upper barrier electrode layer, a lower barrier electrode layer, and an insulation layer, and the insulation layer electrically isolates the upper barrier electrode layer from the lower barrier electrode layer to avoid an electrical short circuit occurring between the two barrier electrode layers.

5. The full-screen 3D image display device according to claim 4, wherein the upper barrier electrode layer and the lower barrier electrode layer are respectively installed with a plurality of electrodes characterized in having a spatial periodic distribution, that is, each electrode has a same width $\overline{b}_0$ and each non-electrode part has a same width $b_0$, where $\overline{b}_0 = b_0$, the single electrode width $\overline{b}_0$ and the single non-electrode width $b_0$ form a basic period width P ($P = \overline{b}_0 + b_0$) of the electrode, and installation positions of the electrodes on the upper barrier electrode layer and the lower barrier electrode layer are offset by the electrode width $\overline{b}_0$ relative to each other.

6. The full-screen 3D image display device according to claim 5, wherein the electrode width is increased to be $\overline{b} + \Delta b$ and the non-electrode width is reduced to be $b_0 - \Delta b$, where $\Delta b$ is an error correction amount greater than 0.

7. The full-screen 3D image display device according to claim 5, wherein any electrode on the upper barrier electrode layer and the lower barrier electrode layer enables the dynamic liquid crystal parallax barrier device at the single electrode to change a shielding state or a light-transmissive state through a proper driving voltage.

8. The full-screen 3D image display device according to claim 5, wherein the electrodes on the upper barrier electrode layer and the lower barrier electrode layer are respectively formed by a vertical strip parallax barrier, a slant-and-strip parallax barrier, or a slant-and-step parallax barrier.

9. The full-screen 3D image display device according to claim 1, wherein the dynamic liquid crystal parallax barrier device comprises an upper linear polarizer, an upper transparent substrate, an upper common electrode layer, an upper insulation layer, an upper barrier electrode layer, an upper alignment layer, a liquid crystal molecular layer, a lower alignment layer, a lower barrier electrode layer, a lower insulation layer, a lower common electrode layer, a lower transparent substrate, and a lower linear polarizer.

10. The full-screen 3D image display device according to claim 9, wherein light polarization directions of the upper linear polarizer and the lower linear polarizer are perpendicular to each other or parallel to each other.

11. The full-screen 3D image display device according to claim 9, wherein the upper barrier electrode layer and the lower barrier electrode layer are respectively installed with a plurality of electrodes characterized in having a spatial periodic distribution, that is, each electrode has a same width $\overline{b}_0$ and each non-electrode part has a same width $b_0$, where $\overline{b}_0 = b_0$, the single electrode width $\overline{b}_0$ and the single non-electrode width $b_0$ form a basic period width P ($P = \overline{b}_0 + b_0$) of the electrode, and installation positions of the electrodes on the upper barrier electrode layer and the lower barrier electrode layer are offset by the electrode width $\overline{b}_0$ relative to each other.

12. The full-screen 3D image display device according to claim 11, wherein the electrode width is increased to be $\overline{b} + \Delta b$ and the non-electrode width is reduced to be $\overline{b}_0 - \Delta b$, where $\Delta b$ is an error correction amount greater than 0.

13. The full-screen 3D image display device according to claim 11, wherein any electrode of the upper barrier electrode layer and the lower barrier electrode layer enables the dynamic liquid crystal parallax barrier device at the single electrode to change a shielding state or a light-transmissive state through a proper driving voltage.

14. The full-screen 3D image display device according to claim 11, wherein the electrodes on the upper barrier electrode layer and the lower barrier electrode layer are respectively formed by a vertical strip parallax barrier, a slant-and-strip parallax barrier, or a slant-and-step parallax barrier.

15. The full-screen 3D image display device according to claim 1, wherein the consisting of the single-view image $V_k$ is expressed by the following formula:

$$V_k = \sum_{i=0}^{M-1} \sum_{j=0}^{N-1} V_k^{i,j}$$

where $V_k^{i,j}$ is a sub-pixel image at the $i^{th}$ row and $j^{th}$ column on a frame of the flat panel display screen.

16. The full-screen 3D image display device according to claim 1, wherein in the multi-view image dynamic combination and display procedure, when the barrier electrodes have the vertical strip parallax barrier structure, the multi-view combined image $\Sigma_T(t)$ is expressed by the following formula:

$$\Sigma_T(t) = \sum_{i=0}^{M-1} \sum_{n=0}^{int(N/No)-1} \sum_{k=0}^{No-1} V_k^{i, n \times No + Mod\left(\frac{T-k}{No}\right)}$$

where t is any time, T is an acting time point, and the values thereof are determined by the following relation:

$$T = Mod\left(int\left(\frac{t}{T_{sync}}\right) \Big/ No\right)$$

where int is a rounding function, Mod is a remainder function, and thus T is a positive integer $0 \leq T \leq No-1$; when $T-k<0$, the Mod function has the following relation:

$$Mod\left(\frac{T-k}{No}\right) = Mod\left(\frac{No+T-k}{No}\right).$$

17. The full-screen 3D image display device according to claim 1, wherein in the multi-view image dynamic combination and display procedure, when the barrier electrodes have the slant-and-strip parallax barrier structure or the slant-and-step parallax barrier structure, the multi-view combined image $\Sigma_T(t)$ is expressed by the following formula:

$$\Sigma_T(t) = \sum_{i=0}^{M-1} \sum_{n=0}^{int(N/No)-1} \sum_{k=0}^{No-1} V_k^{i, n \times No + Mod\left(\frac{i+T-k}{No}\right)}$$

where t is any time, T is an acting time point, and the values thereof are determined by the following relation:

$$T = Mod\left(int\left(\frac{t}{T_{sync}}\right) \Big/ No\right)$$

where int is a rounding function, Mod is a remainder function, and thus T is a positive integer $0 \leq T \leq No-1$; when $i+T-k<0$, the Mod function has the following relation:

$$\text{Mod}\left(\frac{i+T-k}{No}\right) = \text{Mod}\left(\frac{No+i+T-k}{No}\right).$$

18. The full-screen 3D image display device according to claim 1, wherein in the barrier electrode dynamic driving procedure, when light polarization directions of the upper linear polarizer and the lower linear polarizer are perpendicular to each other, the dynamic liquid crystal electrode driving voltage $v_T^m(t)$ is expressed by the following formula:

$v_T^m(t)=0$, when $T-\text{Mod}(m/No)=0$ $v_T^m(t)=v$, when $T-\text{Mod}(m/No)\neq 0$ where m is an index of the electrode, v is a driving voltage signal of the barrier electrode, t is any time, and T is an acting time point which is determined by the following relation:

$$T = \text{Mod}\left(\text{int}\left(\frac{t}{T_{sync}}\right)/No\right)$$

where int is a rounding function, Mod is a remainder function, and thus T is a positive integer $0 \leq T \leq No-1$.

19. The full-screen 3D image display device according to claim 1, wherein in the barrier electrode dynamic driving procedure, when light polarization directions of the upper linear polarizer and the lower linear polarizer are parallel to each other, the dynamic liquid crystal electrode driving voltage $v_T^m(t)$ is expressed by the following formula:

$v_T^m(t)=v$, when $T-\text{Mod}(m/No)=0$ $v_T^m(t)=0$, when $T-\text{Mod}(m/No)\neq 0$ where m is an index of the electrode, v is a driving voltage signal of the barrier electrode, t is any time, and T is an acting time point which is determined by the following relation:

$$T = \text{Mod}\left(\text{int}\left(\frac{t}{T_{sync}}\right)/No\right)$$

where int is a rounding function, Mod is a remainder function, and thus T is a positive integer $0 \leq T \leq No-1$.

* * * * *